US011890868B2

(12) United States Patent
Freymond et al.

(10) Patent No.: US 11,890,868 B2
(45) Date of Patent: Feb. 6, 2024

(54) MACHINE FOR PROCESSING INDIVIDUAL SHEETS

(71) Applicant: BOBST MEX SA, Mex (CH)

(72) Inventors: Olivier Freymond, Neyruz-sur-Moudon (CH); Patrick Wittwer, Puidoux (CH); Javier Perez, Nyon (CH); Nicolas Mosetti, Froideville (CH); Romain Bersier, Penthalaz (CH); Mathieu Gavin, Essertes (CH); Roberto Valterio, Ollon (CH)

(73) Assignee: BOBST MEX SA, Mex (CH)

( * ) Notice: Subject to any disclaimer, the term of this patent is extended or adjusted under 35 U.S.C. 154(b) by 207 days.

(21) Appl. No.: 17/593,494

(22) PCT Filed: Mar. 18, 2020

(86) PCT No.: PCT/EP2020/057524
§ 371 (c)(1),
(2) Date: Sep. 20, 2021

(87) PCT Pub. No.: WO2020/188008
PCT Pub. Date: Sep. 24, 2020

(65) Prior Publication Data

US 2022/0219926 A1 Jul. 14, 2022

(30) Foreign Application Priority Data

Mar. 21, 2019 (WO) ................ PCT/EP2019/057151

(51) Int. Cl.
*B65H 5/04* (2006.01)
*B65H 5/08* (2006.01)
(Continued)

(52) U.S. Cl.
CPC ........... *B41J 13/226* (2013.01); *B41J 11/007* (2013.01); *B41J 13/0027* (2013.01);
(Continued)

(58) Field of Classification Search
CPC . B65H 5/04; B65H 5/085; B65H 5/14; B65H 5/224; B65H 2406/343; B65H 2406/344; B65H 2406/361; B41J 11/007
See application file for complete search history.

(56) References Cited

U.S. PATENT DOCUMENTS 4,834,232 A 5/1989 Freermann
9,421,795 B2 * 8/2016 Dekel ...................... B65H 5/04
(Continued)

FOREIGN PATENT DOCUMENTS

CN 101171135 A 4/2008
CN 101971320 A 2/2011
(Continued)

OTHER PUBLICATIONS

International Search Report dated Dec. 20, 2019 in corresponding International Application No. PCT/EP2019/057151 (3 pages).
(Continued)

*Primary Examiner* — Luis A Gonzalez
(74) *Attorney, Agent, or Firm* — Bookoff McAndrews PLLC

(57) ABSTRACT

A machine for processing individual sheets comprises at least one processing station, in particular in inkjet printing station, and a transport system (100) for transporting the individual sheets through the processing station, along a transport direction. The transport system (100) comprises at least one gripper conveyor (150) movable along the transport direction, for gripping one of the individual sheets defining a sheet position in transport direction. The transport system (100) further comprises at least one support conveyor (190) movable along the transport direction for supporting a region of the individual sheet, wherein the support conveyor (190) comprises a vacuum system for supporting the individual sheet on an interacting surface of the support conveyor, the vacuum system comprising a plurality of
(Continued)

orifices in the interacting surface. The machine allows for efficient and flexible handling of individual sheets, in particular large format sheets of materials such as corrugated cardboard or other materials that have a certain degree of inherent stability.

18 Claims, 12 Drawing Sheets

(51) Int. Cl.

| | |
|---|---|
| ***B41J 13/22*** | (2006.01) |
| ***B41J 11/00*** | (2006.01) |
| ***B41J 13/00*** | (2006.01) |
| ***B65H 5/14*** | (2006.01) |
| ***B65H 5/22*** | (2006.01) |

(52) U.S. Cl.

CPC ............... *B65H 5/085* (2013.01); *B65H 5/14* (2013.01); *B65H 5/224* (2013.01); *B41J 13/0063* (2013.01); *B65H 2406/343* (2013.01); *B65H 2406/344* (2013.01); *B65H 2406/361* (2013.01); *B65H 2555/13* (2013.01); *B65H 2701/1311* (2013.01); *B65H 2701/1313* (2013.01); *B65H 2801/03* (2013.01)

(56) References Cited

U.S. PATENT DOCUMENTS

| | | | |
|---|---|---|---|
| 2013/0088554 | A1 | 4/2013 | Veis |
| 2013/0170928 | A1 | 7/2013 | Veis |
| 2014/0160213 | A1 | 6/2014 | Atwood et al. |
| 2016/0039223 | A1 | 2/2016 | Shapira et al. |
| 2017/0203898 | A1 | 7/2017 | Hosek et al. |

FOREIGN PATENT DOCUMENTS

| | | | |
|---|---|---|---|
| CN | 107352298 | A | 11/2017 |
| CN | 108016832 | A | 5/2018 |
| CN | 112867605 | A | 5/2021 |
| CN | 112867684 | A | 5/2021 |
| DE | 102007014876 | A1 | 4/2010 |
| DE | 102014203821 | A1 | 9/2014 |
| DE | 102017205868 | A1 | 11/2017 |
| EP | 2093176 | A2 | 8/2009 |
| EP | 3020559 | A1 | 5/2016 |
| EP | 3315309 | A1 | 5/2018 |
| JP | 2001179673 | A | 7/2001 |
| WO | 2012108870 | A1 | 8/2012 |
| WO | 2017011923 | A1 | 1/2017 |
| WO | 2017011924 | A1 | 1/2017 |

OTHER PUBLICATIONS

International Search Report dated Jun. 22, 2020 in corresponding International Application No. PCT/EP2020/057524 (3 pages).

* cited by examiner

MACHINE FOR PROCESSING INDIVIDUAL SHEETS

CROSS-REFERENCE TO RELATED APPLICATION(S)

This application is a National Stage under 35 U.S.C. § 371 of International Application No. PCT/EP2020/057524, filed Mar. 18, 2020, which claims priority to International Application No. PCT/EP2019/057151, filed Mar. 21, 2019, the contents of all of which are incorporated by reference in their entirety.

TECHNICAL FIELD

The invention relates to a machine for processing individual sheets, the machine comprising at least one processing station and a transport system for transporting the individual sheets through the processing station, along a transport direction. The invention further relates to a process for processing individual sheets.

BACKGROUND ART

Machines for the processing of individual sheets, such as sheets of corrugated cardboard, are known. They may be dedicated to different processing methods and comprise e. g. inkjet printing machines or laser processing machines such as laser cutting machines.

As an example, DE 10 2014 203 821 A1 (Xerox) discloses an image registration system which helps to accurately produce an image onto an oversized media substrate (e. g. of corrugated cardboard) in a large scale printer, for example an inkjet printer. The system includes a rail support track, a printing zone and a platen cart moveable along the rail support track through said printing zone. The image registration system also includes an image capturing apparatus for capturing a position of the media substrate in relation to the platen cart in order to ensure accurate image on media substrate reproduction.

DE 10 2007 014 876 B4 (KBA Metronic) discloses a conveyor system having an elongated guide defining a closed transport path extending through a plurality of treatment stations, especially treatment stations of a printing machine, and a plurality of carriers movable on the guide along the path and each capable of holding a respective workpiece. At least one magnet is provided on each carrier, and an annular row of individually energizeable electromagnets extends along the path and is capable of exerting force on the magnets of the carriers so as to displace the respective carriers along the path.

The machines according to the prior art comprise platen carts or carriers, respectively, wherein each of the carts or carriers is capable of holding a workpiece. If workpieces of different dimensions shall be processed, the carts or carriers need to be replaced, or elements for holding the workpieces on the carts or carriers need to be readjusted. This leads to considerable changeover times and may require additional storage space for the different carts or carriers needed. Furthermore, in the case of large individual sheets, suitable carts or carriers are bulky and have a considerable weight, thus reducing the achievable dynamics and throughput with respect to the sheet transport.

WO 2012/108870 A1 (Hewlett-Packard Development Company) relates to a media transport assembly for an inkjet printing machine, including a plurality of pallets arranged to circulate on an endless track through a print zone and a handling zone. In the print zone, the pallets are temporarily grouped together to support and move a print media during printing at a substantially constant velocity. In the handling zone, the pallets are spaced apart from each other as they circulate back to the print zone without supporting any print media. The pallets may be provided by a vacuum mechanism to apply negative pressure or vacuum at a vacuum surface portion to draw and removably secure the print media against and relative to a top portion of the pallet. In another embodiment is the vacuum source located remotely from the individual pallets, and the track guiding and constraining the movement of the pallets includes a vacuum conduit cooperating with a vacuum recess extending across the width of the respective pallet.

The solution with the integrated vacuum mechanism makes the pallets rather complex and costly. If the alternative solution is chosen, it is required to employ a number of pallets if the vacuum force shall be evenly applied to large media. This makes the handling of the sheets more complicated.

SUMMARY OF THE INVENTION

It is the object of the invention to create a machine pertaining to the technical field initially mentioned, that allows for evenly supporting large sized sheets in a comparably simple manner.

The solution of the invention is specified by the features of claim 1. According to the invention, the transport system comprises at least one gripper conveyor movable along the transport direction, for gripping one of the individual sheets defining a sheet position in transport direction, and the transport system further comprises at least one support conveyor movable along the transport direction for supporting a region of the individual sheet. The support conveyor comprises a vacuum system for supporting the individual sheet on an interacting surface of the support conveyor, the vacuum system comprising a plurality of orifices in the interacting surface.

In particular, the support conveyor supports a region of the individual sheet extending over the entire width of the sheet (across the transport direction) but only over part of the length of the individual sheet (in transport direction). The extension of the supported region in the transport direction is substantially smaller than the corresponding extension of the sheet that is not supported by the gripper conveyor (or the gripper conveyors). After all, support of the sheet to be processed is primarily required in the processing region of the processing station.

As discussed in more detail below, it is not required that the vacuum source is comprised by the vacuum system of the support conveyor but it may be arranged separate therefrom, and vacuum lines may connect it to the vacuum system of the support conveyor.

Instead of having a rather bulky and heavy carrier supporting the sheet over its entire surface, a gripper conveyor (or two or more gripper conveyors) is combined with at least one support conveyor. The gripper conveyor as well as the support conveyor are substantially less bulky and much lighter. Furthermore, adaptation to different sheet sizes is facilitated.

The additional support conveyor and the vacuum system improve the flatness of the individual sheet. This is particularly advantageous in the case of large substrates or substrates with low inherent stability. The vacuum system having a plurality of orifices in the interacting surface allows for evenly supporting also large sized substrates.

The effect of vacuum system may be easily controlled by adjusting the underpressure. This allows for flexibly adapting the characteristics of the support to the stages of the process and/or different characteristics such as sheet size, thickness and material or the actual process, respectively.

The invention is applicable in particular to inkjet printing machines where the processing station is an inkjet printing station. However, the invention is not restricted to such machines but applies to other machines where large sized sheet-like substrates are processed, including e. g. laser processing (e. g. laser cutting) machines.

In a preferred embodiment, the at least one support conveyor comprises a conveyor connection opening, the conveyor connection opening being fluidly connected to at least one of the plurality of orifices in the interacting surface. The machine further comprises a fixed vacuum distribution unit comprising a distribution unit connection opening fluidly connected to a vacuum source. The distribution unit connection opening is arranged such that a sealed connection with the conveyor connection opening is established, when the support conveyor moves through a processing region of the machine.

The vacuum distribution unit is fixed with respect to the movement of the gripper and conveyors in the transport direction, i. e. it will not be moved during operation of the machine. Nevertheless, the vacuum distribution unit may be adjustably fixed to the machine, e. g. such that its position may be adjusted to the type of sheets that shall be handled.

It is not required that the connection between the distribution unit connection opening and the conveyor connection opening is absolutely tight, but the underpressure generated by the vacuum source should be applied to the vacuum system of the conveyor without a substantial loss of air and (under-)pressure.

The processing region is defined by the processing station of the machine. In the case of an inkjet printing machine, it essentially corresponds to the location of the print heads or print bars and includes the area where ink is applied to the sheets.

Preferably, the vacuum distribution unit comprises a plurality of distribution unit connection openings arranged along the transport direction, connections to the vacuum source being selectively switchable for at least two subsets of the plurality of the distribution unit connection openings.

All subsets or some of the subsets may include one distribution unit connection opening or several distribution unit connection openings that are arranged in a longitudinal and/or lateral distance from each other. As an example, the connections to the vacuum source may be selectively switchable for subsets (groups) of openings that comprise several openings across the distribution unit and support conveyor, respectively, at essentially the same position along the transport direction. In another example, the distribution unit connection openings have an elongated shape, extending primarily in a direction across the distribution unit, and there is only one opening at a given longitudinal position. In this case it is preferred if any of the distribution unit connection openings may be selectively coupled and shut off with respect to the vacuum source, such that only those connections are activated that lead to the distribution unit connection opening(s) that is/are in a cooperating position with respect to the conveyor connection opening(s).

Having a plurality of distribution unit connection openings that may be selectively used to connect the support conveyor to the vacuum source allows for supplying the support conveyor in an operation area having an extension along the transport direction that is substantially longer than the support conveyor itself without having to resort to a vacuum connection moving together with the support conveyor. Accordingly, a simple and robust construction may be achieved, and the dynamics of the machine is not compromised.

Accordingly, a process for processing individual sheets comprises the steps of:

a) gripping one of the individual sheets by a gripper conveyor running in a transport direction;
b) the gripper conveyor transporting the gripped sheet along the transport direction, through a processing station;
c) during transport through the processing station, supporting a region of the gripped sheet by a support conveyor running in the transport direction,
d) during transport of the support conveyor through a processing region of the processing station, selectively switching a number of connections between a vacuum system of the support conveyor and a fixed vacuum source, the connections being arranged along the transport direction.

Advantageously, the distribution unit connection openings extend along a substantial part of the processing region. Preferably, the distribution unit connection openings (measured from a maximum extension of the first opening upstream to the maximum extension of the last opening downstream, along the transport direction) extend along at least 60% of the processing region, most preferably along at least 75% of the processing region. This ensures that the vacuum may be applied on the support conveyor throughout essentially the entire processing operation.

Preferably, the vacuum distribution unit comprises a plurality of chambers arranged along the transport direction, each of the chambers featuring at least one of the distribution unit connection openings and a valve for selectively closing and opening a fluid connection to the vacuum source. In particular, the number of chambers is in the range of 5-30.

In addition or as an alternative, the vacuum source may include several vacuum pumps that may be selectively activated and deactivated, respectively, in order to selectively apply a vacuum to subsets of the plurality of the distribution unit connection openings.

Advantageously, the distribution unit connection openings are arranged in a planar surface extending across the processing region (i. e. perpendicular to the transport direction), and the conveyor connection openings are arranged in a planar surface of the support conveyor on an opposite side of the interacting surface. In particular, the interacting surface constitutes the upper horizontal surface of the support conveyor, and the planar surface opposite thereof is a lower horizontal surface of the support conveyor. This allows for a simple and efficient airflow within the support conveyor and provides a large surface for the exchange of air between the support conveyor and the distribution unit.

Alternatively, the conveyor connection openings are arranged on a lateral surface of the support conveyor or in an edge region of the upper surface, and the distribution unit connection openings are arranged correspondingly, essentially laterally outside of the support area for the sheets.

Preferably, the machine comprises a controller for controlling the movement of the support conveyor and the selective switching of the connections to the vacuum source, wherein the controller is configured to control the selective switching in synchronism with the movement of the support conveyor. This means that the connection between the vacuum source and the connection opening(s) of the support conveyor is switched in such a way that it is established only if the support conveyor is in a position where the sealed connection is established. This is the case only in a certain range of the support conveyor's position along the transport direction, accordingly the switching is synchronized with the support conveyor's movement in order to avoid air and pressure loss.

Preferably, the support conveyor comprises a mechanism for adapting the vacuum system to a sheet width of the processed individual sheet. In particular, individual elements of the vacuum system (such as vacuum orifices or chambers and/or groups of vacuum orifices or chambers) may be selectively switched on and off. This allows for switching off elements lying completely or partially outside the paper width. The switching mechanism may include valves for the closing and opening of supply lines and/or sliders for covering individual or groups of elements. In certain embodiments, adaptation to the sheet width may be obtained by having a number of separate chambers in the support conveyor, each of the chambers connecting one or several conveyor connection openings with a subset of the vacuum orifices on the interacting surface of the support conveyor lying in a certain lateral region, and having corresponding distribution unit connection openings that may be selectively coupled to the vacuum source.

By adjusting the active width of the vacuum system, the required power may be reduced because the sucking of air in regions outside the support sheets is avoided. Furthermore, the print quality is improved because air movement along the lateral edges of the sheet is prevented, and accordingly a deflection of ink droplets in those regions due to the vacuum system is avoided. A preferred embodiment of the inventive machine comprises a vacuum distribution unit with the plurality of selectively switchable distribution unit connection openings arranged along the transport direction as well as the mechanism for adapting the vacuum system to the sheet width. This allows for adjusting the operation of the machine to the all dimensions of the processed sheet, and minimizes the required power for the vacuum system as well as unwanted air movement in regions along the edges of the sheet.

A cushioning device, in particular an air cushioning device comprising a plurality of Bernoulli cups, may be combined with the vacuum system. Bernoulli cups allow for supporting substrates, especially thin substrates such as sheets, with minimum contact and without substantially hindering relative movement between the sheet and the cups parallel to the sheet plane. They allow for guiding a substrate in a predetermined distance from a surface, which means that they allow for precisely positioning the sheet in a predetermined height and therefore in a predetermined distance from a processing device (e. g. print bars in the case of an inkjet printing machine). This ensures invariable high processing quality. For their operation the Bernoulli cups need pressurized air, no vacuum supply is required.

The combination of Bernoulli cups with the vacuum system allows for homogenously supporting the sheet, thus improving the sheet flatness, and at the same time moving the support conveyor relative to the sheet with reduced friction. Furthermore, having a vacuum system as well as a cushioning device improves the flexibility of the device with respect to handling substrate of different sizes and/or materials as operation parameters of the vacuum system as well as of the cushioning device may suitably adjusted.

The vacuum system may be constituted by one or several vacuum chambers that are connected to the plurality of orifices in the interacting surface. The Bernoulli cups may be distributed along the width of the support conveyor. Their orifices lead into the interacting surface as well.

Instead of Bernoulli cups, air bearings may be used, in particular aerostatic bearings.

Preferably, the supported individual sheet and the support conveyor are movable along the transport direction with respect to each other, in particular even in the supported state of the sheet, i. e. the position of the support conveyor with respect to the sheet is not fixed. It is to be noted that relative movement between the sheet and the support conveyor may be in transport direction or against the transport direction.

Due to the fact that the support conveyor is movable with respect to the sheet, the optimum support position (e. g. with respect to the processing station) may always be chosen and the longitudinal extension of the support conveyor may be minimized, which reduces the weight and inertia of the support conveyors (thus increasing the achievable dynamics of the machine) and facilitates the handling thereof.

Preferably, the machine includes a control system for controlling a movement of the gripper conveyor and the support conveyor such that the supported region coincides with a processing region of the processing station. Accordingly, during operation a distance between the gripper conveyor and the support conveyor is changed during the transport through the processing station in order to ensure that the supported region coincides with a processing region of the processing station.

Taking into account the present location of the gripper conveyor(s), the location of the support conveyor is chosen in such a way that the sheet is stably supported in the processing region. If no gripper conveyor is in the processing region or immediately adjacent thereto, the location of the support conveyor will be generally opposite the processing station, in the processing region. Preferably, the longitudinal extension of the support conveyor is chosen such that the sheet is supported with perfect flatness in the processing region.

Preferably, during transport through the processing station, a transport speed of the support conveyor is smaller than a transport speed of the gripper conveyor. The control system is designed to control the speeds accordingly. This allows for controlling the movements of the gripper conveyor(s) and of the support conveyor in such a way that in a first stage, the support conveyor is supporting a region close to the leading edge of the transported sheet. Subsequently, the support conveyor "lags" with respect to the gripper conveyor(s) and therefore supports regions of the sheet further away from the leading edge, approaching the trailing edge.

In certain cases, especially for the processing of comparably small sheets, it will not be required to change the distance between the gripper conveyor and the support conveyor during the transport through the processing station. The inventive machine allows for a corresponding mode of operation.

Preferably, in particular if the supported individual sheet and the support conveyor are movable along the transport direction with respect to each other, the interacting surface of the support conveyor comprises a plurality of rollers having a rotation axis substantially perpendicular to the transport direction, i. e. having a rotation axis that includes an angle of 5° or less with a line that is perpendicular to the transport direction and parallel with the main plane defined by the interacting surface. This reduces the friction between the individual sheet and the support conveyor, in particular when the movement of the support conveyor is decelerated or accelerated with respect to the gripper conveyor. In particular, the interacting surface comprises a number of rollers arranged in parallel.

When processing corrugated sheet material it is preferred to have a rotation axis that is oriented parallel to the main plane but slightly inclined to the perpendicular direction, in particular including an angle of 1-15° therewith. This avoids engagement of the rollers with the corrugated board and ensures even support of the corrugated sheet. The width of the support conveyor may be covered by a plurality of groups arranged in succession, along the main extension of the interacting surface, each group including a number of parallel rollers (e. g. 3-12 rollers).

Preferably, the transport system comprises a circulating track, wherein the at least one gripper conveyor and the at least one support conveyor are running along the circulating track and wherein a section of the circulating track extends in transport direction. Having a circulating track simplifies the recirculation of the gripper conveyors and support conveyors, no additional recirculation system is needed, and the gripper and support conveyors are always arranged on the track, i. e. during normal operation, no introduction or removal of gripper or support conveyors is required. During operation of the machine, the gripper and support conveyors will usually stand still or move in a single predetermined direction.

Advantageously, the circulating track extends in a first plane, and the gripper and support conveyors are guided along the circulating track in such a way that along the transport track a main surface of individual sheets held by the gripper conveyors and supported by the support conveyors extends in a second plane, the second plane being perpendicular to the first plane and oriented along the transport direction. In particular, the first plane is oriented in a vertical direction, the second plane as well as the transport direction are oriented horizontally. This means that the footprint of the machine is not substantially affected by having a circulating track, as the recirculation of the gripper conveyors happens below (preferred) or above the transport track.

Preferably, the transport system further comprises a linear motor being controllable in such a way that movements of the at least one gripper conveyor and of the at least one support conveyor along the circulating track are individually controllable. This means in principle that the movement of a given gripper conveyor or support conveyor may be controlled independently from the movement of every other gripper conveyor or support conveyor (or further moveable units interacting with the transport track). It is to be noted that during operation of the machine movements of several gripper conveyors and support conveyors will usually be synchronized, and there may be constraints with respect to the relative positions and movements of several gripper conveyors and support conveyors that have to be taken into account when controlling the movement of the conveyors. Nevertheless, the linear motor and the conveyors are built in such a way that individual control is possible.

As an alternative to having a linear motor with a circulating track, a linear motor may be used for a straight track leading through the processing station, and other means are provided for recirculating the gripper conveyors to the start of the straight track.

Advantageously, at least one first gripper conveyor comprises a gripper mechanism for gripping a leading edge of one of the individual sheets and at least one second gripper conveyor comprises a gripper mechanism for gripping a trailing edge of the individual sheet. Accordingly, for transporting the individual sheet through the processing station, a leading edge of the sheet is gripped by the first gripper conveyor and a trailing edge of the sheet is gripped by the second gripper conveyor, the at least one support conveyor being arranged between the first gripper conveyor and the second gripper conveyor in the transport direction.

Gripping the individual sheets along their leading edge and their trailing edge allows for efficient and flexible handling of individual sheets, in particular large format sheets of materials such as corrugated cardboard or other materials that have a certain degree of inherent stability (such as thick cardboard sheets, plastic sheets, thin metal sheets etc.). Due to the fact that the gripper conveyors are individually controllable, the machine is easily readjusted for different sheet formats. There is no need for having a cart or carrier the dimensions of which matching the dimensions of the sheets to be processed, but the readjustment of the relative distance of the gripper conveyors for gripping the leading edge and the trailing edge, respectively, is sufficient for adapting the machine to different sheet dimensions in the transport direction (length). With respect to the sheet dimension across the transport direction (width), at least in the case of rectangular sheets, it does not matter if the grippers exceed the sheet width.

Having support conveyors to support the substrate between the leading and trailing gripper conveyors, the dimensions of the gripping conveyors along the transport direction may be chosen to be very short, in any case much shorter than the length of the individual sheets. Accordingly, the movable units of the transport system are much smaller and lighter than the carts or carriers of the prior art, thus allowing for faster dynamics and higher throughput. At the same time, adequate support of the sheets is ensured.

Preferably, after gripping, a distance between the first gripper conveyor and the second gripper conveyor is controlled in such a way that a tensioning force is applied to the individual sheet for straightening the individual sheet. In combination with the supporting action of the support conveyor, this reduces bending of the sheet along the transport direction. Using the individually controllable conveyors, the tensioning force may be precisely controlled.

Preferably, in the case of an inkjet printing machine, the printing station comprises a plurality of inkjet print bars, the print bars covering a printing region extending in a direction across the transport direction. In preferred embodiments, the print bars are essentially fixed in a lateral direction, and they cover the whole width of the print area all the time. In other embodiments, scanning print bar arrangements are employed.

Nevertheless, in general, the invention may be applied to other kinds of printing systems, especially printing systems for the printing of large sheet-like substrates, as well as to other systems for processing large sheet-like substrates.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Figure 1A:
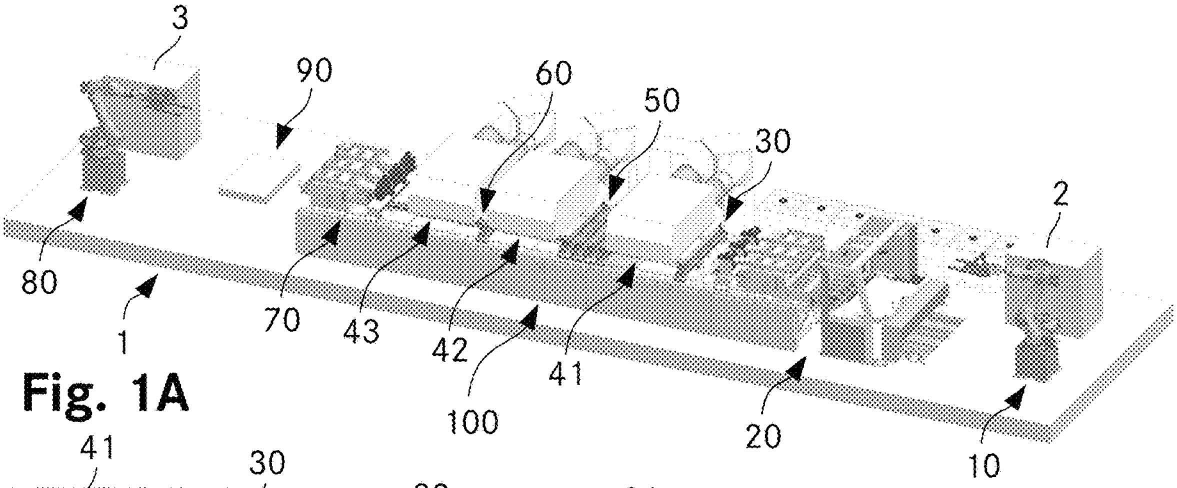
FIG. 1A An oblique view of a printing machine according to the invention.
Figure 1B:
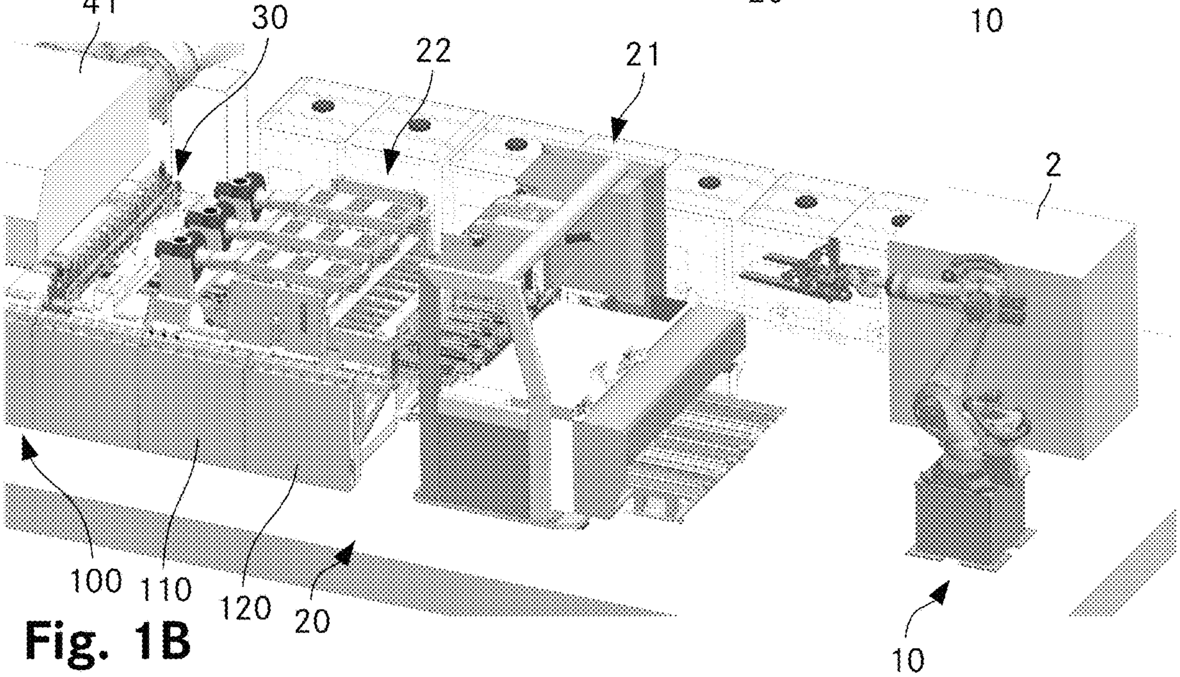
FIG. 1B, 1C detailed views of FIG. 1A showing the starting and end sections of the machine, respectively.
Figure 1C:
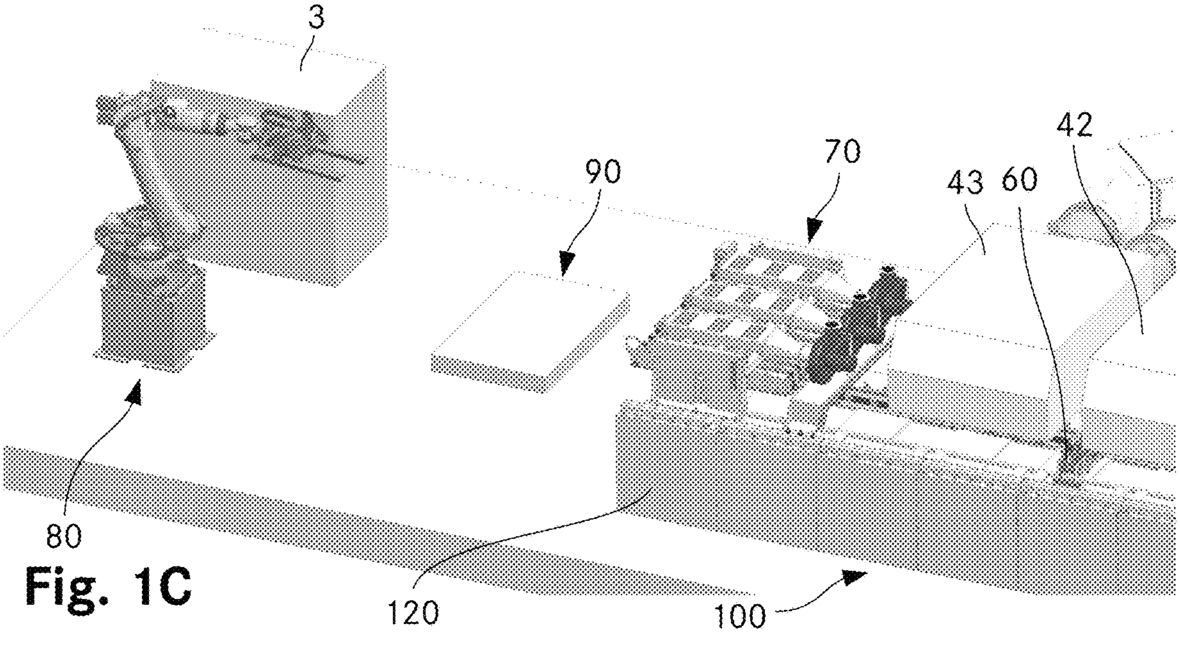

The FIG. 1A is an oblique view of a printing machine according to the invention, the FIGS. 1B, 1C are detailed views of FIG. 1A showing the starting and end sections of the machine, respectively.

The printing machine 1 according to the shown embodiment is a continuously operated single pass inkjet printing machine for printing individual sheets, e. g. from corrugated cardboard. The maximum format of the individual sheets is 2.1×1.3 m (width×length). Typical thicknesses of corrugated cardboard that may be processed with the machine range from 0.7 to 7.0 mm. The achievable speed is 100 m/min (about 1 sheet per second), the printing resolution is 1'200 dpi. The printing machine is capable of printing water-based ink, e. g. for the printing of food packaging.

The printing machine 1 includes in succession a destacking robot 10 for destacking individual sheets from an input stack 2, a feeding station 20, a precoating station 30, a first drying station 41, a printing station 50 for four-colour inkjet printing, a second drying station 42, a varnishing station 60, a third drying station 43, a removal station 70 and a stacking robot 80 for stacking the processed individual sheets onto an output stack 3. An accommodating space 90 is provided between the removal station 70 and the stacking robot 80. It may accommodate a further station such as a quality control station. A circulating transport system 100 extends from the feeding station 20 to the removal station 70. It is described in more detail below.

All drying stations 41, 42, 43 are built alike, in a manner known as such, providing infrared and warm air drying. The destacking robot 10 and the stacking robot 80 are articulated arm robots and built alike, featuring gripper means for gripping partial stacks of individual sheets. The printing station 50 as well as the precoating station and the varnishing station 60 are based on print bars extending over the entire width of the machine. A suitable print bar technology is described in WO 2017/011923 A1 and WO 2017/011924 A1 (filed by Radex AG, now Mouvent SA).

The input stack 2 has a typical height of about 2 m. From the input stack 2, the destacking robot 10 seizes partial stacks having a height of about 20 cm, turns them over and feds them to the feeding station 20. The feeding station 20 is constituted of a first unit 21 and a second unit 22. The first unit 21 comprises a sheet lift and a number of manipulators. The sheet lift receives a partial stack from the destacking robot 10. The sheets of the partial stack are lifted by the sheet lift. The uppermost sheet is seized by a lateral bar, using a vacuum system, the present lateral position is determined and the sheet is positioned in an exact predetermined lateral position. The orientation is ensured by suitable guides. This exact lateral position and orientation of the sheet is maintained until the sheet is seized by the circulating transport system 100.

The sheet is then fed to the second unit 22 comprising in a first stage a set of upper transport bands and a set of lower transport bands. All transport bands extend in the longitudinal direction, parallel to the transport direction of the sheets. In the first stage, the sheets are received between the two sets of transport bands. In a second stage of the second unit 22, the sheets are attached to the top set of belts only, using a vacuum system. It is from this second stage where the sheets are seized by the circulating transport system 100. The belt and vacuum system ensures that the sheets are provided in a flat state, their lateral position and orientation corresponding to that defined by the first unit of the feeding station 20.

The removal station 70 basically corresponds to the second stage of the second unit 22 of the feeding station 20, i. e. the processed sheets are received from the circulating transport system 100 by means of a set of upper vacuum belts. These belts transport the sheets one by one to the next station.

Figure 2:
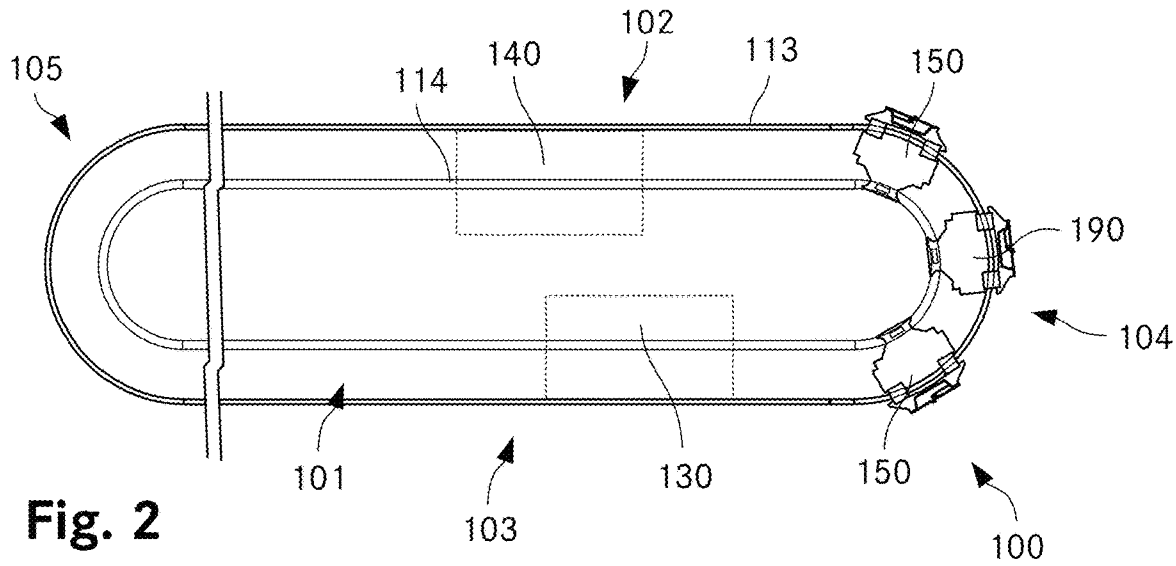
FIG. 2 a schematic side view of the circulating track of the machine.
Figure 3:
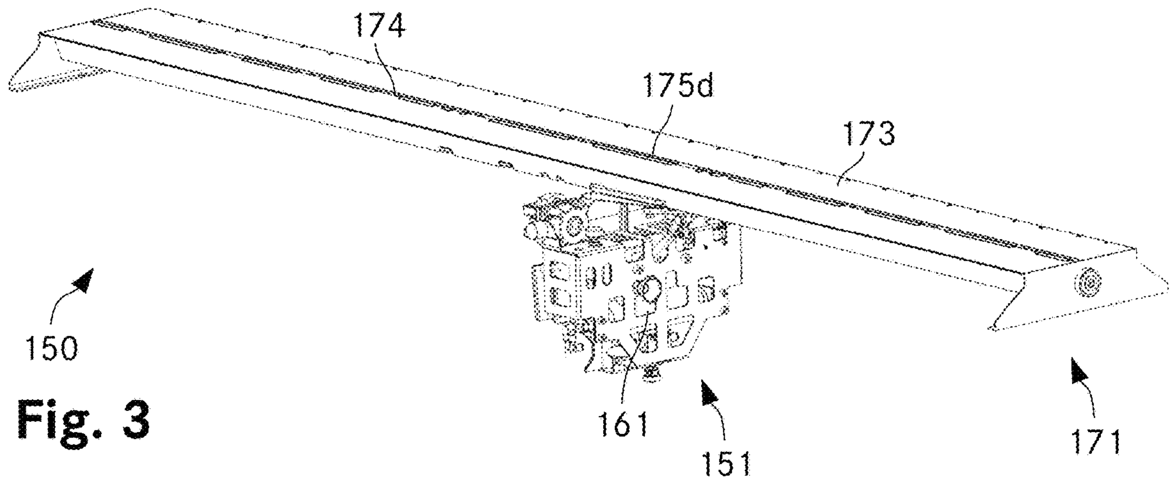
FIG. 3 an oblique view of a gripper conveyor.
Figure 5A:
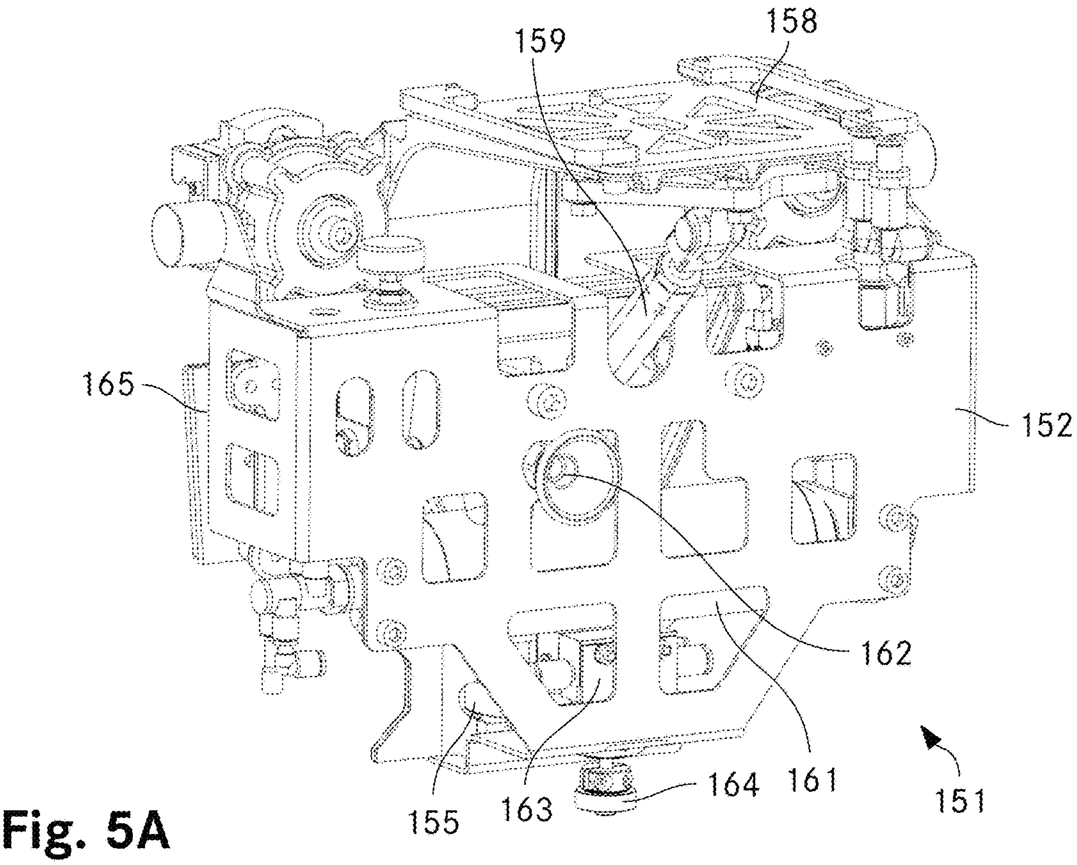
FIG. 5A, 5B two oblique views of the base part of the gripper conveyor.
Figure 5B:
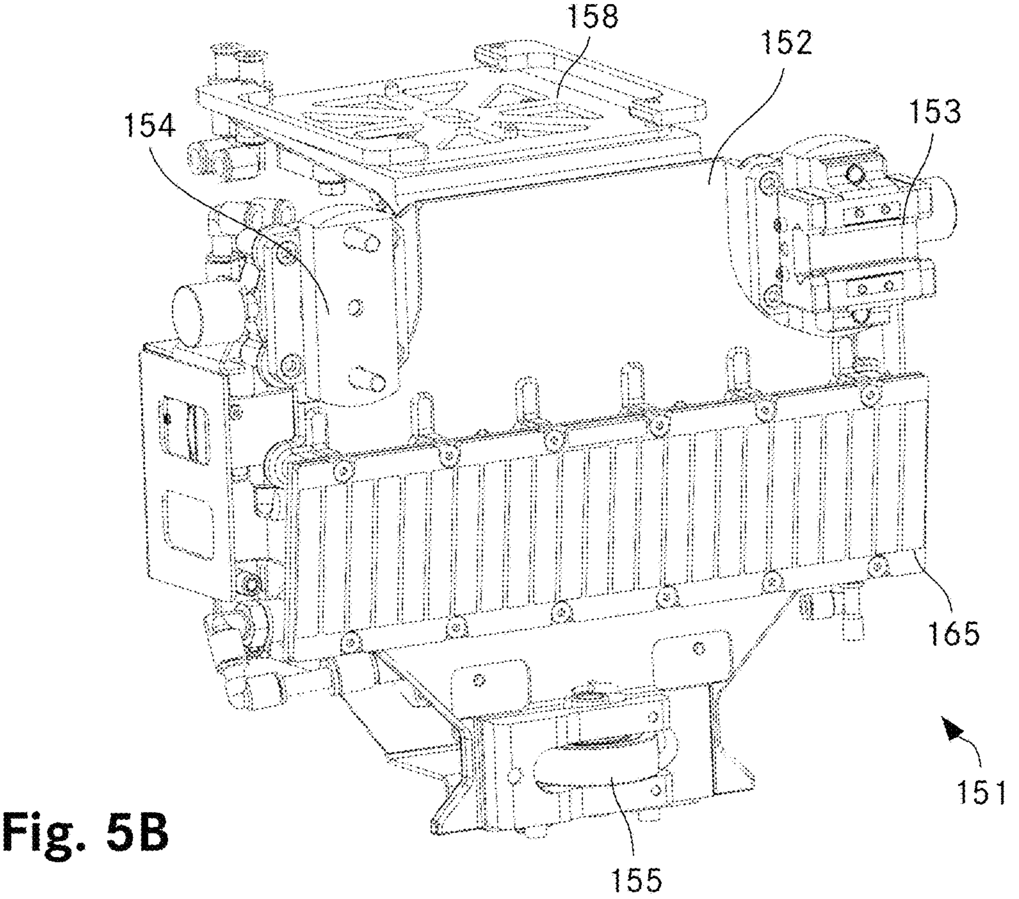
Figure 6:
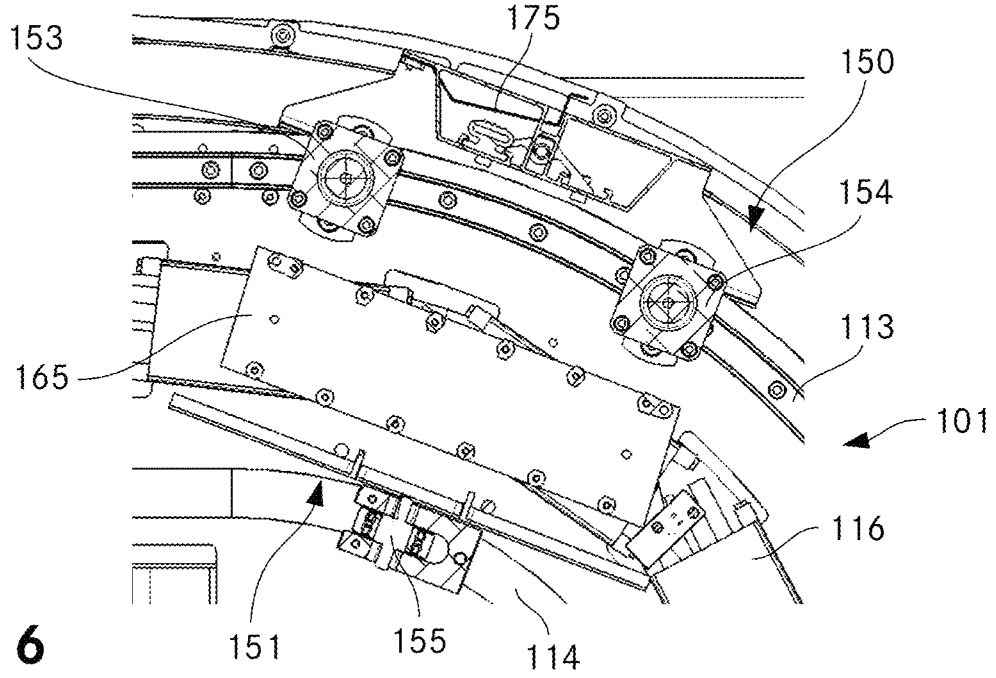
FIG. 6 a cross-sectional view illustrating the interaction between the gripper conveyor and the track.

The FIG. 2 is a schematic side view of the circulating track of the machine. The FIG. 3 shows an oblique view of a gripper conveyor, the FIG. 4 a side view of the clamping bar of the gripper conveyor, and the FIGS. 5A, 5B two oblique views of the base part of the gripper conveyor. The FIG. 6 is a cross-sectional view illustrating the interaction between the gripper conveyor and the track, along a plane between the housing and elements for interacting with the track, attached to or protruding from the housing.

The circulating transport system 100 includes a circulating track 101 constituted by an upper straight section 102, a lower straight section 103, a first turning section 104 (input side) and a second turning section 105 (output side), the turning sections 104, 105 linking the upper straight section 102 and the lower straight section 103. The upper straight section 102 and the lower straight section 103 are provided by track modules 110, the turning sections 104, 105 are provided by the end modules 120 (see FIG. 1B, 1C). As shown in FIG. 6, the main components of the circulating track 101 are the carrying rail 113, the guide rail 114 and the electromagnets 116 (not shown in FIG. 2). The described track has a length of about 2×10 m plus the two turning sections, along the track the linear motor features about 90 electromagnets 116, 30 gripper conveyors 150 and 15 support conveyors 190 are simultaneously interacting with the track 101. The gripper conveyors 150 and support conveyors 190 interact with the carrying rail 113 at two points of contact and with the guide rail 114 at a further point of contact, as described in more detail below.

An air supply station 130 is provided in the lower straight section 103. An air supply mechanism 140 is provided in the upper straight section 102, in the region of the printing station 50. These components are described in more detail below.

Figure 4:
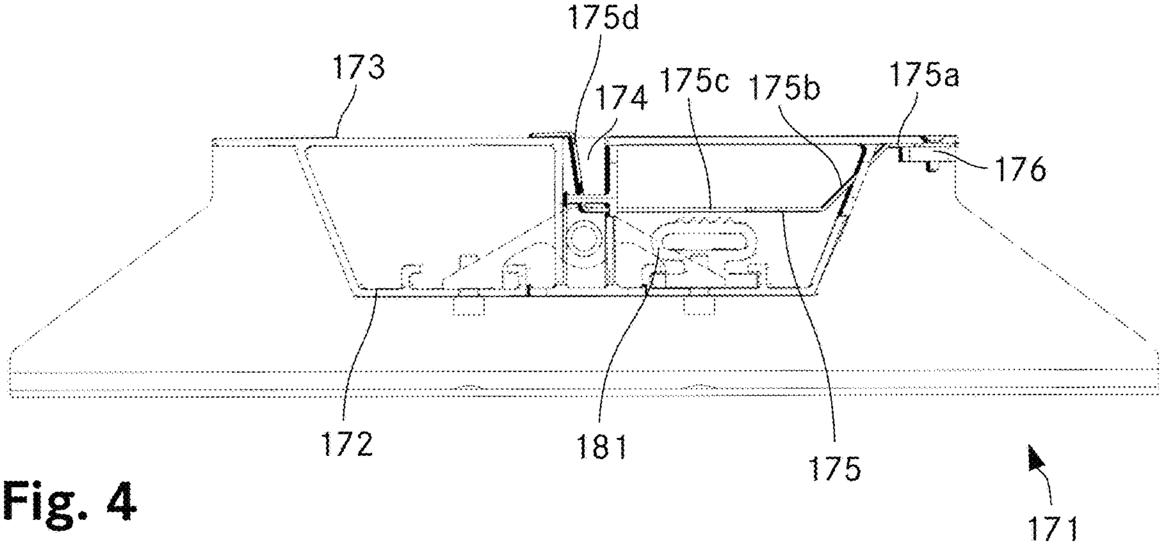
FIG. 4 a side view of the clamping bar of the gripper conveyor.

The gripper conveyor 150 includes a base part 151 and a clamping bar 171 mounted on top of the base part 151. The FIGS. 3, 4 show a clamping bar 171 which is designed to clamp a trailing edge of an individual sheet to be processed. The clamping bar 171 features a main profile 172, which is prismatic and has a basically trapezoid cross-section. The longer of the parallel sides of the trapezoid constitutes the upper surface of the clamping bar 171, together with extensions extending to both sides. The upper surface is a support surface 173 for the individual sheet to be processed. It features a slit 174 extending from one lateral end of the clamping bar 171 to the other.

A clamping spring 175 made of spring steel is attached to one of the extensions of the main profile 172. In cross section, a first section 175*a* of the clamping spring 175 is supported on the inner face of the extension and mounted to the main profile 172 by a mounting block 176 screwed to the extension. A second section 175*b* of the clamping spring 175 extends from the first section 175*a*, bent to the inside of the main profile 172 by an angle of about 45°. A third section 175*c* extends from the second section, bent to the upper surface of the clamping bar 171 by an angle of about 45°, i. e. the third section 175*c* extends parallel to the upper surface (support surface 173). Attached to the free end of the third section 175*c* are L-shaped clamping elements 175*d*, arranged along the whole length of the clamping spring 175, and penetrating the slit 174 in the support surface 173, the shorter leg of the clamping elements 175*d* being supported on the support surface 173, i. e. on the outside of the main profile 172.

The clamping bar 171 further comprises an elongated inflatable tube 181. It is attached to the section of the main profile 172 forming the shorter parallel side of the trapezoid and is arranged in between this section of the profile 172 and the third section 175*c* of the clamping spring 175. In the deflated state shown in FIG. 4, the tube 181 does not impact any force on the clamping spring 175, and due to its geometry and elasticity, the clamping spring 175 exerts a certain clamping force to the support surface 173 of the clamping bar 171.

The inflatable tube 181 is a closed air container and features a single access, linked to a vent. In an uninflated state, the tube 181 has an oval cross-section. By inflating the tube 181 with compressed air, the tube 181 changes its shape to a more circular cross-section, i. e. the height of the tube 181 increases and its width decreases. This has the effect that the third section 175*c* of the clamping spring 175 is contacted by the outer surface of the tube 181 and moved in the direction of the support surface 173. The clamping elements 175*d* are moved as well and their short legs are raised from the support surface 173, such that a gap is formed for receiving a sheet edge. The maximum gap height exceeds the maximum thickness of the substrates to be processed. In the shown case, the maximum gap height is 12 mm.

If the inflatable tube 181 is deflated again, the force between the tube 181 and the clamping spring 175 decreases to substantially zero, and the clamping force between the clamping spring 175 and the sheet (or the support surface 173) is reestablished due to the elasticity of the clamping spring 175.

The base part 151 comprises a housing 152. The housing 152 mounts two rail guides 153, 154, both including a rotational bearing, on which a guide element for interacting with a guide rail is mounted. In the FIG. 6B, one of the guide elements is displayed, the other is omitted for illustration purposes. The two rail guides 153, 154 are arranged near the upper edge of the housing 152, on the front as well as on the back end thereof. The rotational axes of the rotational bearings are parallel to each other and run perpendicular to a lateral surface of the housing 152. In a central section of the lower edge of the housing 152, a support roll 155 is mounted. The rotational axis of the support roll 155 runs parallel to the lateral surface of the housing 152 and perpendicular to the support surface 173 of a clamping bar 171 mounted to the base part 151.

Attached to the housing 152 is a holding part 158 for mounting a clamping bar 171 (as shown in FIGS. 3, 4). The holding part 158 is connected to the housing 152 by a mounting flange as well as by an adjustment lever 159, one of the lateral surfaces of the housing 152 and the holding part 158 forming an essentially L-shaped element, the adjustment lever 159 extending from the housing 152 to the free end of the leg forming the holding part 158. The adjustment lever 159 allows for precisely adjusting an angle between the longitudinal extension of the clamping bar 171 and the plane defined by the two rail guides 153, 154 and the support roll 155.

An air reservoir 161 is accommodated in the housing 152. An air interface 162 is connected to the air reservoir 161 by a line including a check valve. This allows for introducing pressurized air through the air interface 162 into the air reservoir 161. The air reservoir 161 is further connected to a multiport valve 163. This valve may be switched between two modes of operation by means of a control pin 164 arranged on an lower surface of the housing 152 as follows:

| control pin | line reservoir-tube | line tube-exterior | effect |
|---|---|---|---|
| not operated | closed | open | tube is deflated |
| operated (pressed) | open | closed | tube is inflated |

Finally, the base part 151 of the gripper conveyor 150 features a permanent magnet bar 165 for interacting with the electromagnets of the stationary part of the linear motor. The magnets are sealed in a slab of synthetic resin. The slab is mounted on a lateral surface of the housing 152, on the same side as the guide elements of the rail guides 153, 154.

The interaction of a gripper conveyor 150 with the carrying rail 113, the guide rail 114 and the electromagnets 116 of the circulating track 101 is discussed in connection with FIG. 6. It shows a part of the circulating track 101 in one of the end modules, where the track is curved. The two rail guides 153, 154 on the base part 151 of the gripper conveyor 150 interact with the carrying rail 113. They are constructed in such a way that lateral as well as normal forces may be transmitted between the gripper conveyor 150 and the carrying rail 113. There are three points of contact, ensuring a defined position of the conveyor with respect to the track at all times, also in the curved sections.

The permanent magnet bar 165 is arranged on the base part 151 in such a way that it aligns with one or two of the local electromagnets 116. The support roll 155 runs on a lateral surface of the guide rail 114 and supports the gripper conveyor 150 against tilting about an axis in the transport direction. By appropriately switching the electromagnets 116, the gripper conveyor 150 moves along the circulating track 101 in a predetermined direction with a predetermined individual speed.

In order to supply compressed air to the air reservoirs 161 of the gripper conveyors 150, the supply station 130 features a compressor and a tank for storing compressed air. The tank is connected to a supply pin arranged on a carriage that may be moved along a linear path by a belt drive driven by a drive motor. A hose linking the tank to the supply pin is guided by a guide chain such that high speed movements of the carriage are enabled.

The supply pin is mounted on the carriage by means of a pneumatic cylinder, which allows for extending or retracting the supply pin with respect to the carriage in a direction perpendicular to the linear path. The free end of the supply pin is provided by a valve, which is opened if a force acts against a valve tip extending from the supply pin. The geometry of the supply pin is adapted to the air interface 162 of the base part 151 of the gripper conveyor 150 (cf. FIG. 5A).

Prior to a gripper conveyor entering the air supply section of the circulating track 101, the carriage is moved to its initial position. As soon as the gripper conveyor 150 is aligned with the carriage, the supply pin is extended by means of the pneumatic cylinder. It enters the air interface 162 of the gripper conveyor 150, and the flow of compressed air is activated by the mechanical contact between a collar of the air interface 162 and the valve tip of the air supply pin. Next, the carriage with the air supply inserted into the air interface 162 follows the linear movement of the gripper conveyor 150 until a retraction point is reached. During this movement, pressurized air is introduced through the air interface 162 into the air reservoir 161 on the gripper conveyor 150. The amount of air is sufficient to operate the gripper mechanism of the gripper conveyor 150 during a full cycle on the circulating track. At the retraction point, the air supply pin is retracted by means of the pneumatic cylinder, and the air supply is automatically stopped as soon as the valve tip loses mechanical contact with the air interface. Finally, the carriage moves back to its initial position, in order to interact with the next guide conveyor.

Figure 7:
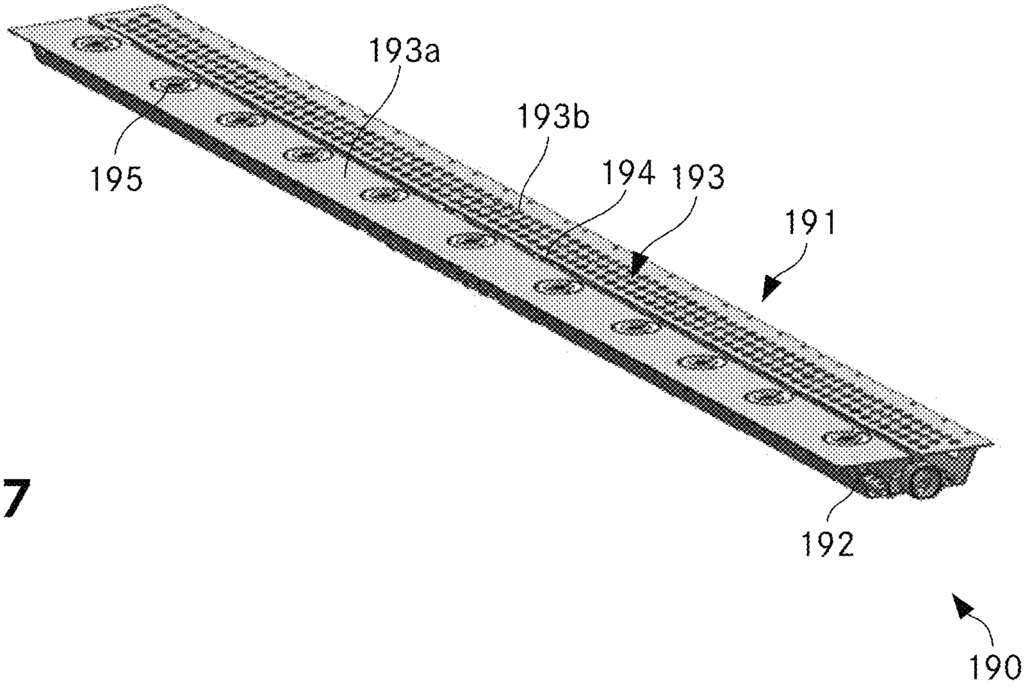
FIG. 7 an oblique view of a first embodiment of a support conveyor.

The FIG. 7 is an oblique view of a first embodiment of a support conveyor. The support conveyor 190 includes a base part (not shown in FIG. 7) and a support bar 191. The base part essentially corresponds to the base part of the gripper conveyor as shown in FIGS. 5A, 5B. In contrast to the base part of the gripper conveyor, an air reservoir is missing and the air interface is connected to the Bernoulli cups. The interaction of the base part of the support conveyor with the circulating track corresponds to the interaction between the gripper conveyor and the track.

The support bar 191 features a main profile 192, which is prismatic and has a basically trapezoid cross-section, the longer of the parallel sides of the trapezoid constituting the upper surface of the support bar 191. The upper surface 193 features a leading region 193*a* and a trailing region 193*b*, separated by a slit 194 extending from one lateral end of the support bar 191 to the other. The leading region 193*a* features eleven Bernoulli cups 195 which are evenly distributed along the bar. The Bernoulli cups 195 are connected to the air interface in the base part. Using valves arranged in the supply lines, some of the cups in the outer regions of the support bar 191 may be selectively activated or deactivated.

The slit 194 provides an escape for the air flow generated by the Bernoulli cups 195 and therefore prohibits the buildup of an extensive air cushion between the support bar 191 and the supported sheet, which would deteriorate the precision of the sheet support. The trailing region 193*b* of the upper surface 193 is provided by a number of circular holes. They help reducing the weight of the support bar 191.

Figure 8:
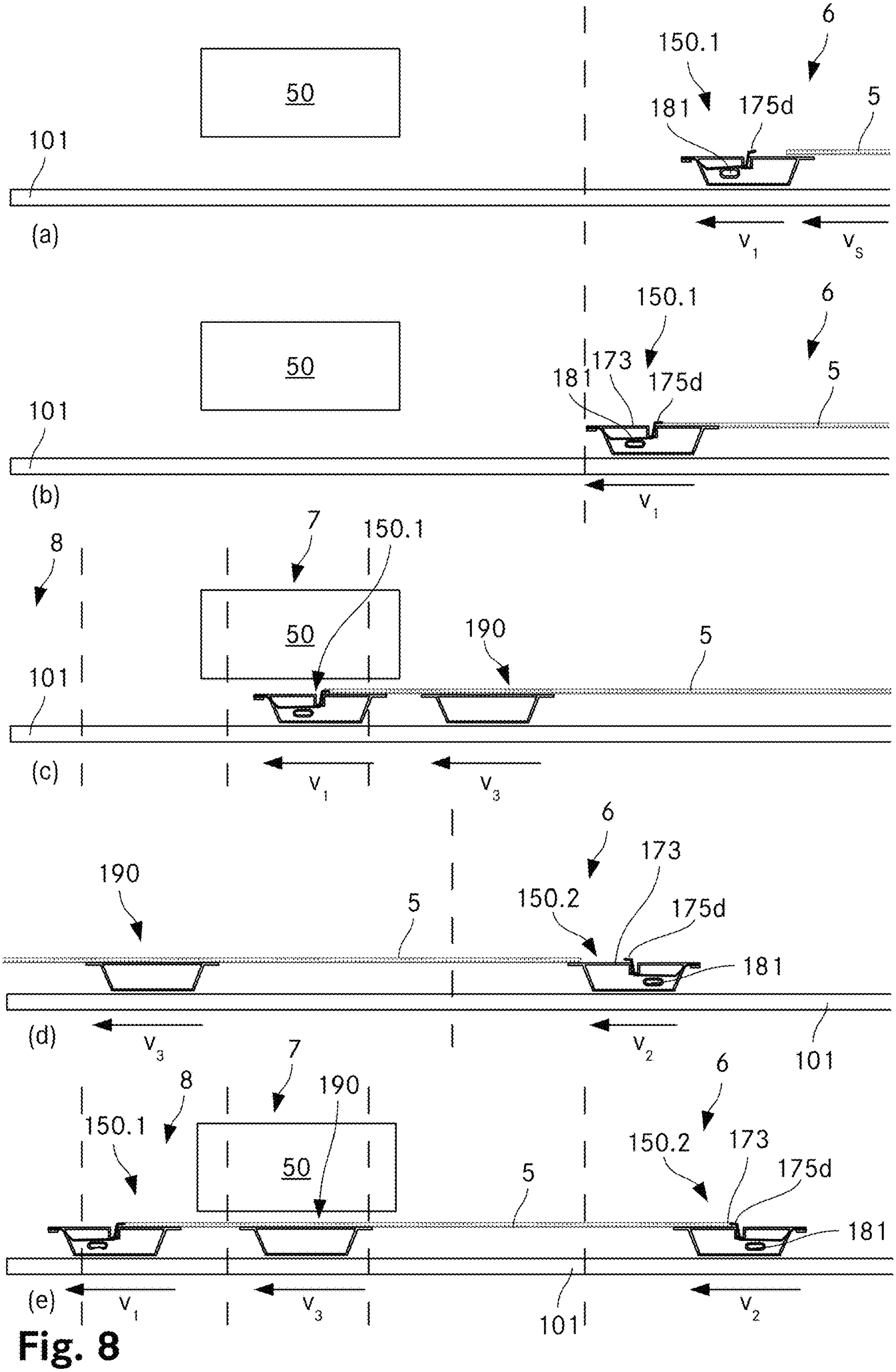
FIG. 8 a schematic illustration of the process of gripping and transporting of a sheet.
Figure 8:
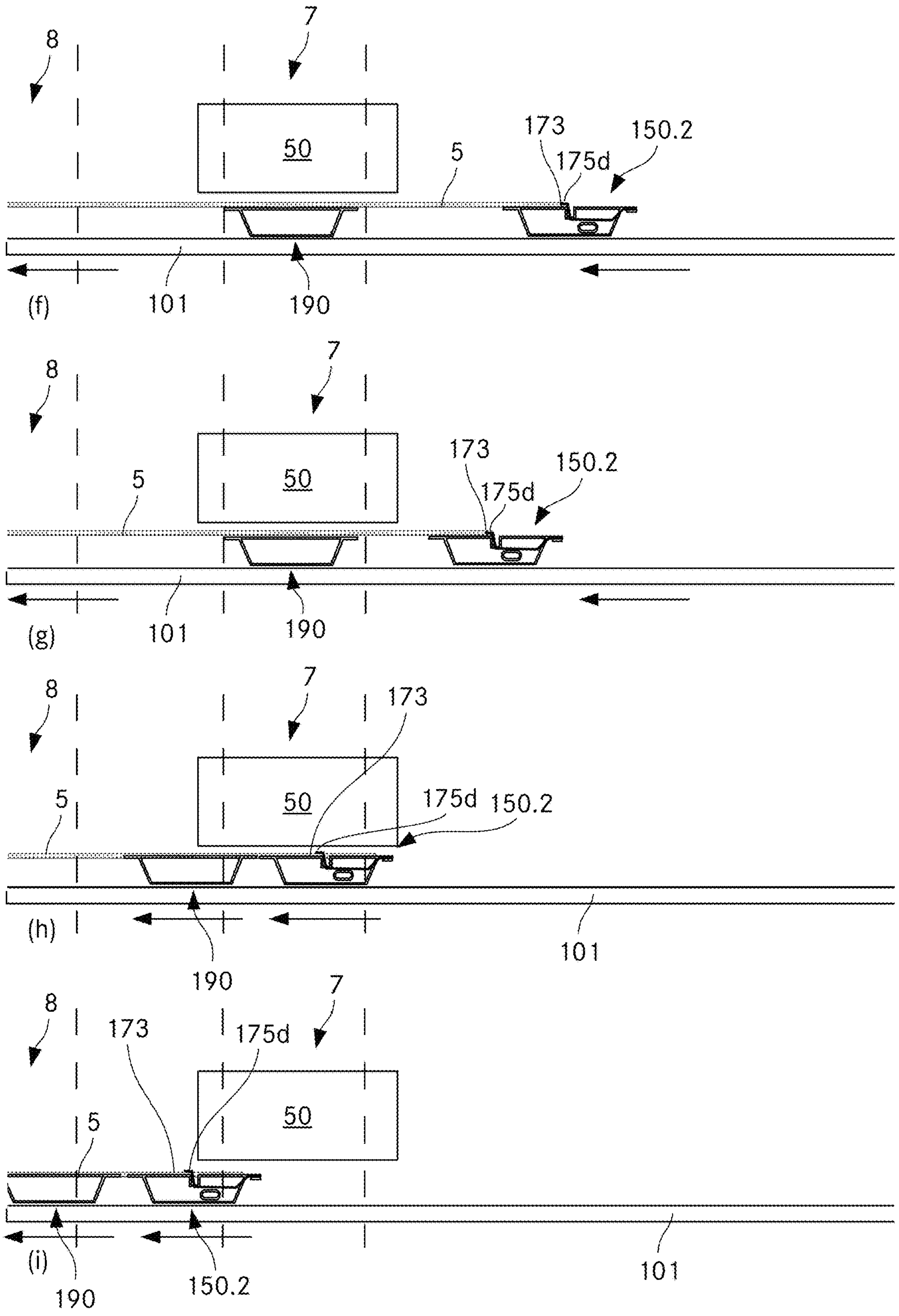

The FIG. 8 is a schematic illustration of the process of gripping and transporting of a sheet. The FIGS. 9A, B are diagrams showing the speeds of the gripper and support conveyors as a function of location on the machine's track according to two alternative operating procedures.

As described above, the sheets 5 are fed from the second unit of the feeding station, held by the upper set of belts and a corresponding vacuum system. As shown in FIG. 8 (*a*), prior to feeding the sheet 5, the first gripper conveyor 150.1 is positioned along the circulating track 101 in a receiving position in a receiving region 6, a transport speed $v_1$ of the gripper conveyor 150.1 (dot-dashed line) is less than a (constant) feeding speed $v_s$ of the sheet 5. In this section, the track 101 features a cam, which interacts with the control pin 164 of the gripper conveyor to inflate the tube 181. This opens the clamping elements 175*d* of the gripper conveyor 150.1. Held by the upper set of belts, the sheet 5 is inserted with its leading edge in between the clamping elements 175*d* and the upper surface 173 of the gripper conveyor 150. As soon as this has happened, the cam ends, the control pin 164 extends and the tube 181 is deflated. At this place, the belts end, i. e. the handover of the respective portion of sheet 5 to the conveyors of the transport system is finished. This leads to the situation depicted in FIG. 8 (*b*).

The first gripper conveyor 150.1 is further moved along the track 101 and a support conveyor 190 is moved below the sheet 5. The support conveyor 190 has the same general buildup as the gripper conveyors 150, however there is no gripping mechanism and therefore no air reservoir or tube. Initially, the support conveyor 190 supports the sheet 5 in a front region thereof, adjacent to the edge being gripped by the first gripper conveyor 150.1, as shown in FIG. 8 (*c*). In this phase, the support conveyor 190 follows the first gripper conveyor 150.1 with a speed $v_3$ corresponding essentially to the feeding speed $v_s$ of the sheet and to the speed $v_1$ of the first gripper conveyor 150.1. Immediately after placing the support conveyor 190 below the sheet 5, a contact element coupled to the free end of a movable flexible hose is connected to a quick-action coupling of the support conveyor 190. This automatically opens a valve, such that pressurized air is supplied to the support conveyor, where it is distributed to those Bernoulli cups that are activated. The hose is coupled until the support conveyor 190 reaches a releasing region 8. There, the quick-action coupling is released, by a control pin interacting with a cam of the track 101 and the hose is retracted. A carrier of the hose is recirculated to the initial position in the receiving region 6.

Next, a second gripper conveyor 150.2 is moved along the track 101 in the receiving region 6, with a transport speed $v_2$ bigger than the present transport speed $v_1=v_s$ of the first gripper conveyor 150.1 with the sheet 5. Again, the clamping elements 175*d* are opened due to interaction of the control pin 164 with the cam, see FIG. 8 (*d*) showing a rear region of the track. The trailing edge of the sheet 5 is received in between the clamping elements 175*d* and the upper surface 173 of the second gripper conveyor 150.2. Finally, as soon as the cam ends, the control pin 164 extends and the tube 181 is deflated.

Figure 9A:
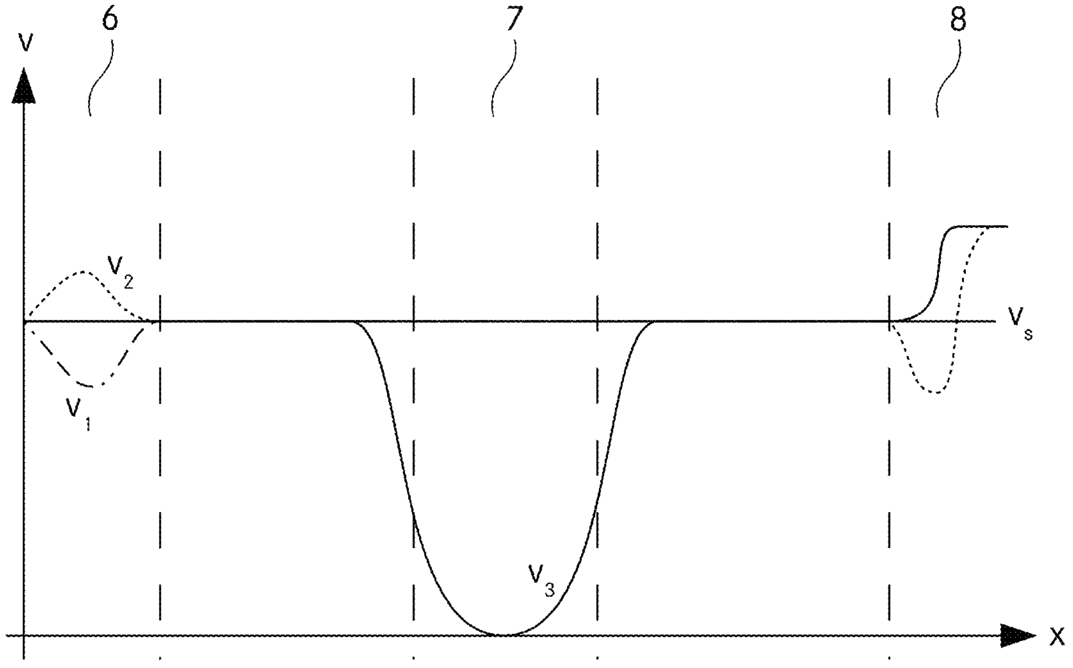
FIG. 9A, B diagrams showing the speeds of the gripper and support conveyors as a function of location on the machine's track.
Figure 9B:
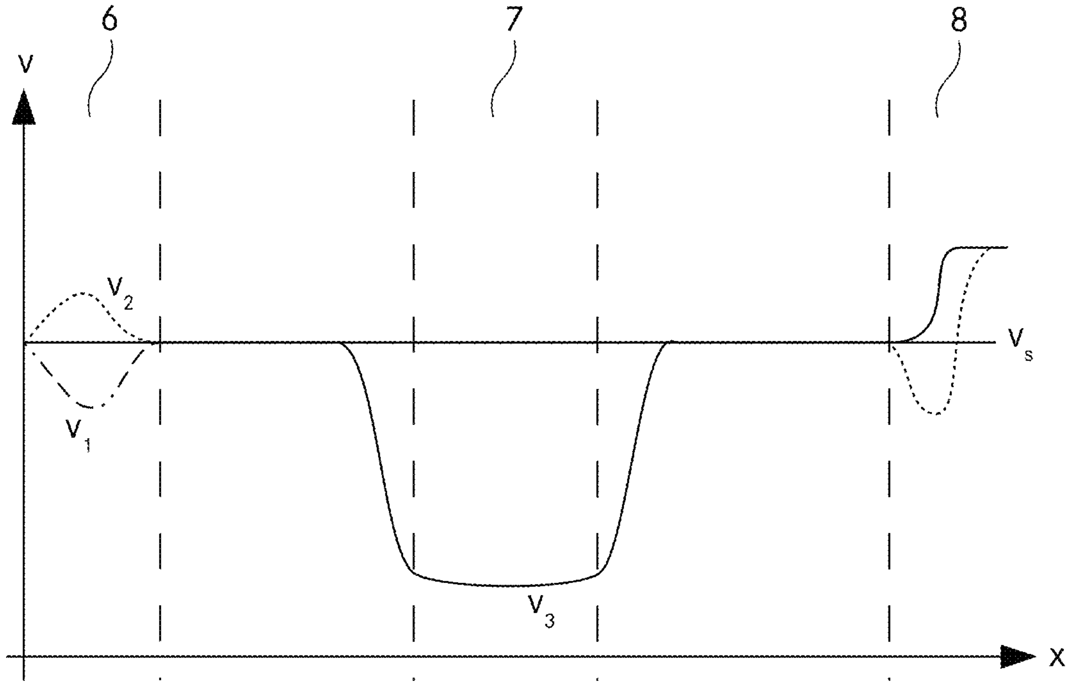

The sheet 5, held by both gripper conveyors 150.1, 150.2 and supported by the support conveyor 190 in a front region is further transported until the printing station 50 is reached. The region of the sheet 5 that is processed by the printing station is supported by the first gripper conveyor 150.1 and the support conveyor 190, see FIG. 8 (*c*), 8 (*e*). In a region immediately upstream the printing region 7 as well as within the printing region 7 itself, the speed $v_3$ of the support conveyor 190 is reduced. The FIGS. 9A, 9B show two different possibilities. According to the progression in FIG. 9A, the support conveyor 190 is standing still in a position facing the printing station 50, i. e. the speed $v_3$ goes down to zero. According to the progression in FIG. 9B, the support conveyor 190 is slowed down to a certain small speed but it is never completely standing still. In both cases, in and around the printing region 7 the speed $v_3$ is considerably smaller than the speed $v_1=v_2=v_s$ of the two gripper conveyors 150.1, 150.2 and the sheet 5, such that the support conveyor 190 lags with respect to the first gripper conveyor 150.1 and the sheet 5 and is approached by the second gripper conveyor 150.2, see FIG. 8 (*f*). During transport, in order to further improve the flatness of the sheet 5, the speeds of the two gripper conveyors 150.1, 150.2 may be adjusted to impart some tensioning force on the sheet 5.

As soon as the second gripper conveyor 150.2 approaches the printing region 7 the speed $v_3$ of the support conveyor 190 is again increased until it reaches the transport speed $v_1=v_2=v_s$ of the gripper conveyors 150.1, 150.2 and the sheet 5. Thus the sheet 5 is transported out of the printing station 50, a rear region immediately adjacent the gripped trailing edge being supported by the support conveyor 190, see FIGS. 8 (*g*), 8 (*h*), 8 (*i*).

From receiving the sheets, during the entire processing the sheets and up to hand over the sheets to the removal station, the gripper conveyors do not require any energy supply. This is due to the following:

- the actuation of the gripping mechanism is based on a mechanical interaction between the control pin and the cam,
- the energy required for actuating the gripping mechanism is provided by the air reservoir on the gripping conveyor, and
- the energy for movement of the conveyors is delivered to the stationary electromagnets of the linear motor.

The only place where external energy is provided to the conveyors is the air supply station, as described above. Nevertheless, despite the passive nature of the conveyors, their movement along the track may be individually controlled. For this purpose, the control system of the printing machine is connected to appropriate sensors for determining the positions of all the grippers.

The handover of the sheets from the gripping conveyors to the removal station essentially corresponds to the feeding of the sheets. This means that after opening the clamping mechanism in a releasing region 8, the speed $v_1$ of the first gripper conveyor 150.1 is increased such that the leading edge of the sheet is released and the conveyor goes into recirculation. In contrast, after opening the respective clamping mechanism, the speed $v_2$ of the second gripper conveyor 150.2 is temporarily decreased to release the trailing edge of the sheet. As soon as the sheet has been removed, the speed $v_2$ is increased to recirculate the second gripper conveyor 150.2. This also applies to the support conveyor 190.

After handover, the gripper conveyors and support conveyors are further moved along the track, passing the first turning section, the lower linear section with the air supply station and the second turning section. Along a first part of the lower linear section, the speed of the conveyors is substantially higher than on the upper linear section. This allows for reducing the recirculation speed in the air supply station and ensures that the gripper conveyors are timely supplied for the next cycle.

The printing machine may further comprise a cleaning station for cleaning the gripper and support conveyors. It may be arranged in the vicinity of the air supply station.

The FIGS. 10A-F provide a schematic illustration of the functioning of the vacuum system of the machine according to the invention. The support conveyors 290 according to a second embodiment include a vacuum system instead of the Bernoulli cups. Apart from these elements, the support conveyors 290 correspond to the support conveyors 190 according to the first embodiment as previously described. Again, only the support bars are shown in the FIG. 10, not the base part that interacts with the circulating track.

The support conveyor 290 comprises connection openings 296 on its lower surface. With respect to the transport direction, they are arranged in a central portion of the support conveyor 290 and extend about half of the length of the lower surface. On its upper surface, the support conveyor 290 features a vacuum orifice array 297 having a large number of vacuum orifices distributed about most of the top surface. As described in more detail below, in connection with FIG. 12, within the support conveyor 290, the connection openings 296 are fluidly connected to groups of orifices of the vacuum orifice array 297 lying above the respective opening.

The vacuum system further comprises a vacuum distribution unit 300 which is fixedly attached to the printing machine and extends in the transport direction over substantially the length of the printing station 50. The vacuum distribution unit comprises a suction line 301, which is connected to a vacuum source (not shown). The suction line 301 is connected to a number n of vacuum channels 302.1 . . . n extending in a vertical direction, upwards from the suction line 301, where n denotes a number in particular in the range of 5 . . . 30. The number may be smaller or larger, depending on the length of the region that needs to be covered. Preferably it is chosen in such a way that the covered length corresponds to the length of the printing region plus the extra length needed to keep the sheet flat before and after the printing unit.

In the FIG. 10, not all the vacuum channels are shown, the middle region that is left out is indicated by dot-dashed lines. All vacuum channels 302.1 . . . n feature a connection opening 303.1 . . . n at their free upper end as well as a valve 304.1 . . . n at their lower end, close to the connection with the suction line 301. Each of the valves 304.1 . . . n comprises a flap pivotable about a horizontal axis perpendicular to the transport direction, that is independently controllable to open and close the connection of the suction line 301 to the respective vacuum channel 302.1 . . . n. In the starting position shown in FIG. 10A, all valves 304.1 . . . n are closed.

The transport path of the support conveyor 290 and the vacuum distribution unit 300 with its vacuum channels 302.1 . . . n are arranged such that the lower surface of the support conveyor 290 cooperates with the upper ends of the walls surrounding the vacuum channels 302.1 . . . n in such a way that an essentially sealed connection may be established between one or more of the connection openings 303.1 . . . n of the vacuum channels 302.1 . . . n and the connection opening 296 of the support conveyor 290.

Figure 11:
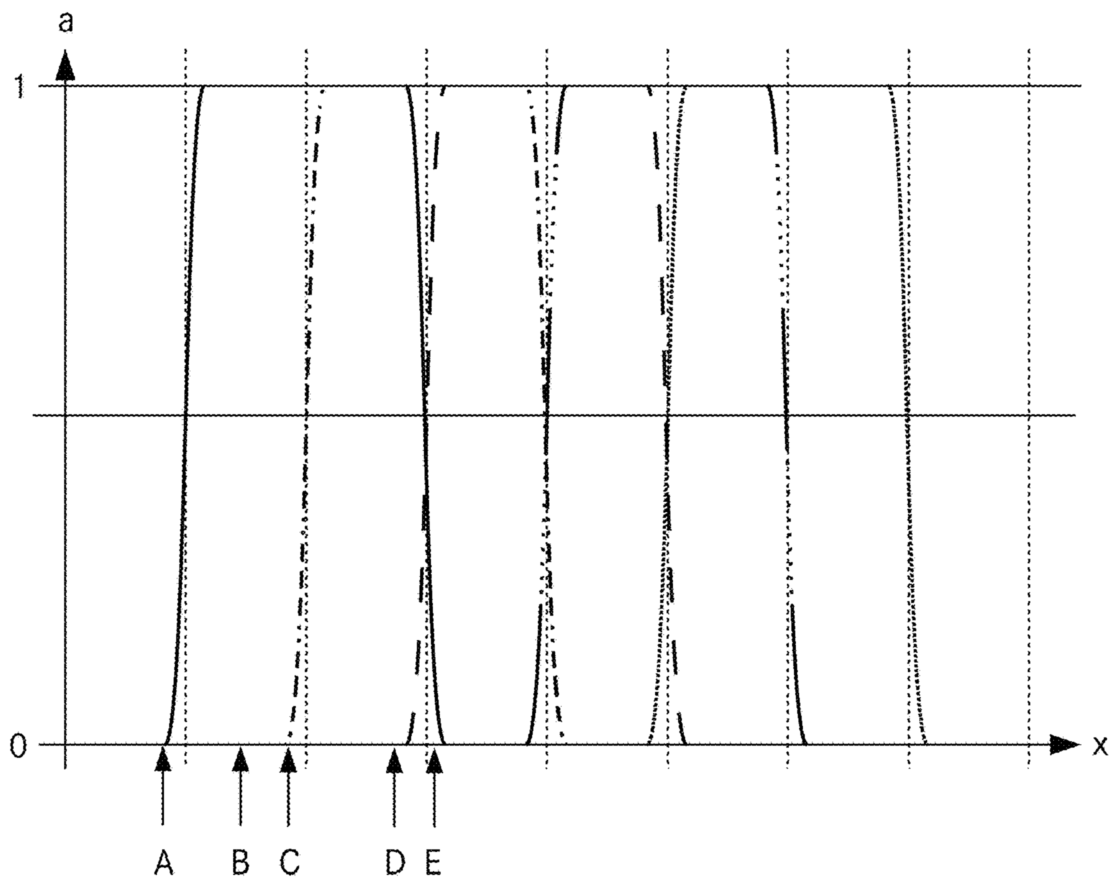
FIG. 11 the positions of some of the valves of the vacuum distribution unit of the vacuum system as a function of the position of the support conveyor along the transport direction.

The FIG. 11 shows the positions of the first five valves 304.1 . . . 5 on the vertical axis (0: fully closed, 1: fully open) as a function of the position x of the support conveyor 290 along the transport direction. The correspondence is as follows:

| | |
|---|---|
| first (upstream) valve 304.1 | solid line |
| second valve 304.2 | dot-dashed line (2 dots-3 dashes) |
| third valve 304.3 | long dashed line |
| fourth valve 304.4 | dot-dashed line (10 dots-1 dash) |
| fifth valve 304.5 | dotted line |

The further valves 304.6, . . . 304.*n* are controlled accordingly.

The positions shown in the FIGS. 10A-10E are indicated in the FIG. 11 by the arrows A-E, respectively.

Figure 10A:
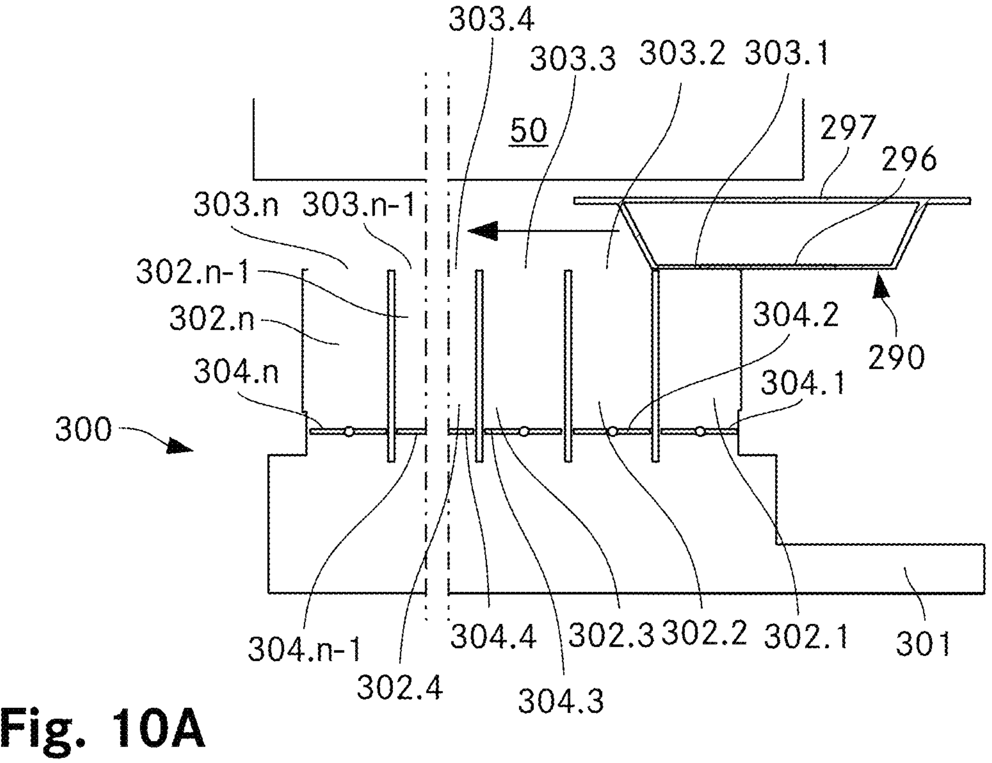
FIG. 10A-F a schematic illustration of the functioning of the vacuum system of the machine according to the invention.
Figure 10B:
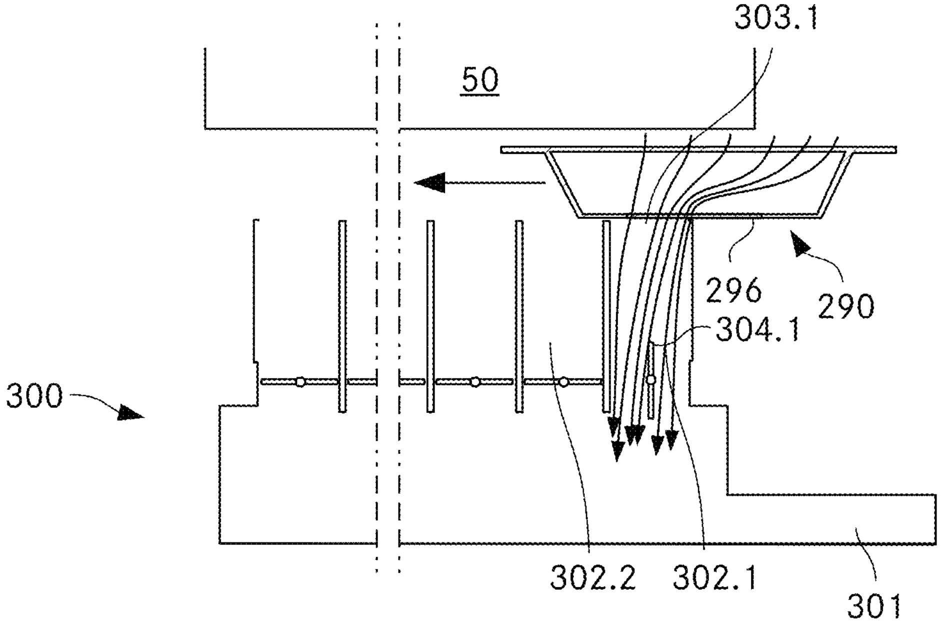
Figure 10C:
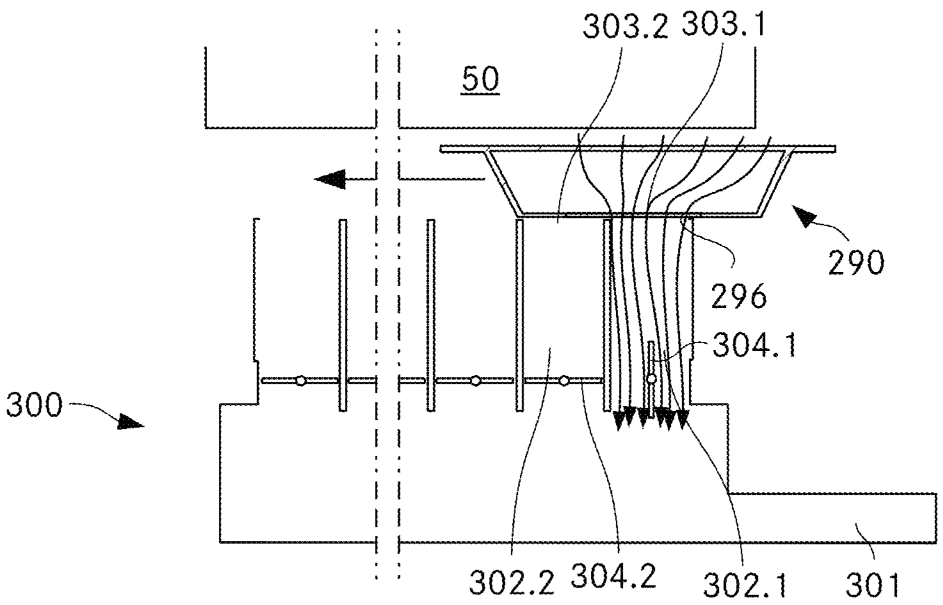
Figure 10D:
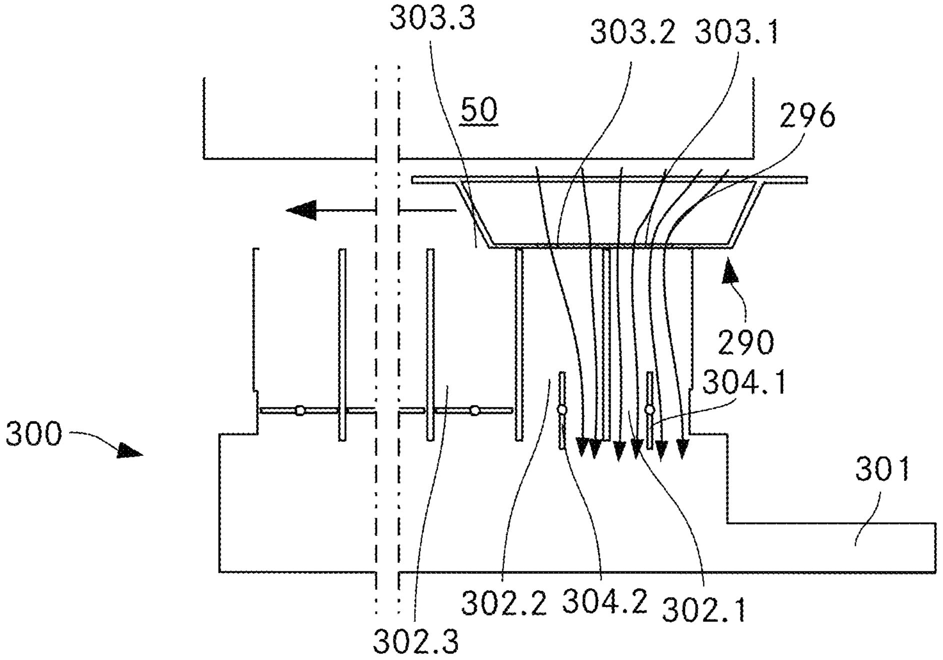

As soon as the connection opening 303.1 of the first (upstream) vacuum channel 302.1 has been sealed by the lower surface of the support conveyor 290, i. e. if the support conveyor 290 has reached the position along the transport direction shown in FIG. 10A, the corresponding valve 304.1 in the first vacuum channel 302.1 is opened, in this position the extension of the opening between the first vacuum channel 302.1 and the connection opening 296 along the transport direction is about 20 mm. This establishes a fluid connection between the orifices of the vacuum orifice array 297 and the vacuum source, such that a sheet supported by the support conveyor 290 (not displayed) is firmly pressed against the upper surface of the support conveyor 290. The situation and the resulting airflow are schematically shown in FIG. 10B.

The support conveyor 290 is further moved along the transport direction. As soon as the second vacuum channel 302.2 is sealed by the lower surface of the support conveyor 290, i. e. if the support conveyor 290 has reached the position along the transport direction shown in FIG. 10C, the valve 304.2 in the second vacuum channel 302.2 is opened. Subsequently, for a certain period the first vacuum channel 302.1 as well as the second vacuum channel 302.2 are connected to the connection opening 296 of the support conveyor as well as to the vacuum source, cf. FIG. 10D.

Figure 10E:
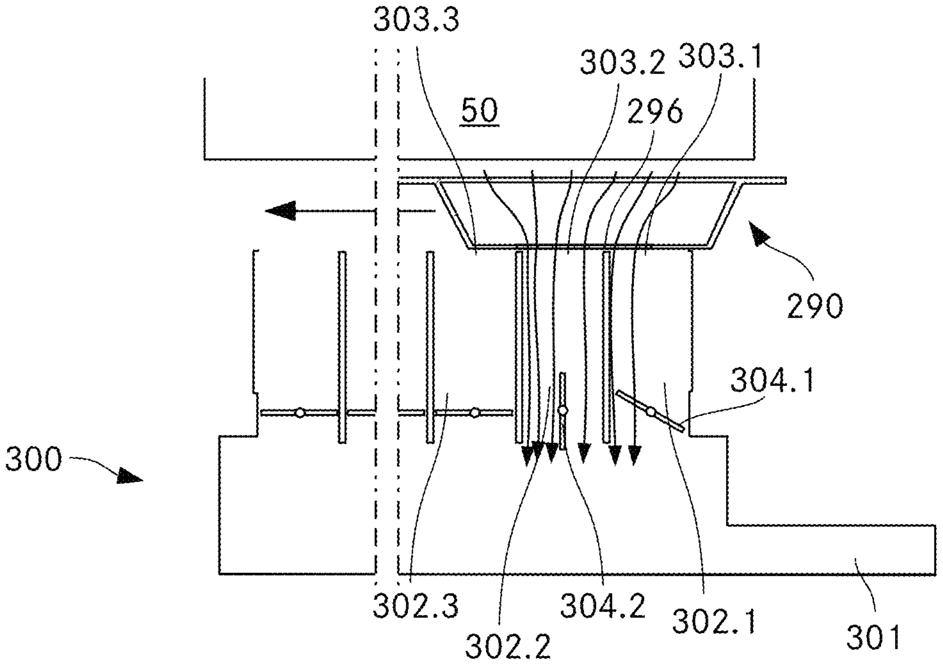

Before the sealing relationship between the lower surface of the support conveyor 290 and the first vacuum channel 302.1 is lost due to the further movement of the support conveyor 290, the valve 304.1 is closed, cf. FIG. 10E.

Figure 10F:
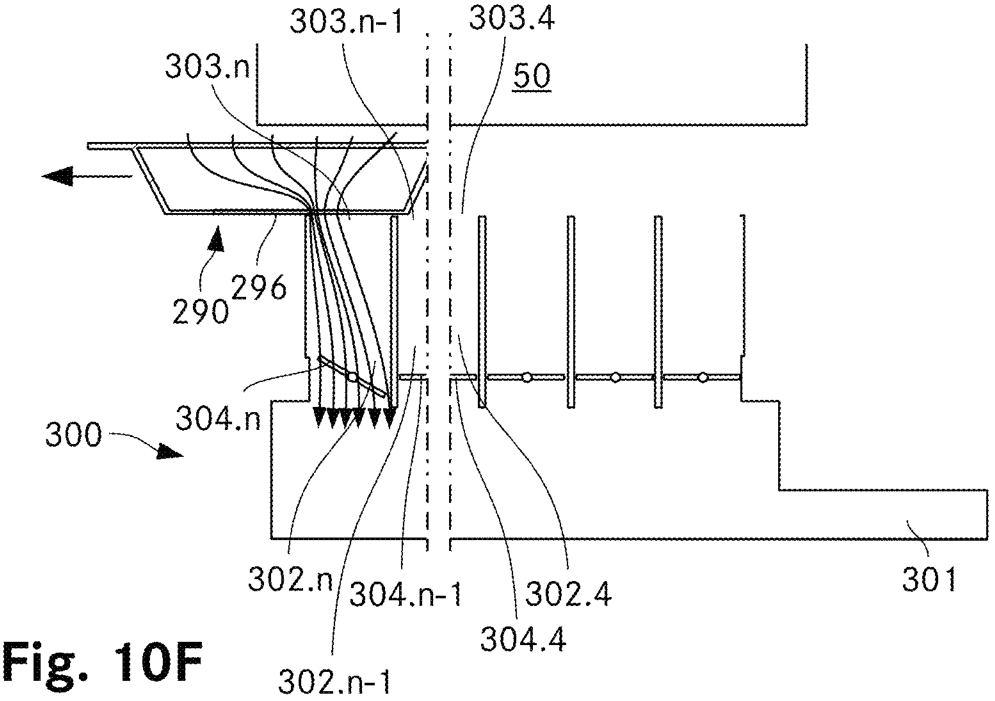

The process continues, wherein the support conveyor 290 transported along the vacuum distribution unit 300 cooperates successively with the vacuum channels 302.2, 302.3, 302.4, . . . , 302.*n*−1, 302.*n*. The valve 304.*n* of the last (downstream) vacuum channel 302.*n* is closed before the sealing relationship of the lower surface of the support conveyor 290 with the last vacuum channel 302.*n* is lost. This is the moment when the vacuum support ends (cf. FIG. 10F showing the situation immediately prior the closing of the last valve 304.*n*).

Figure 12:
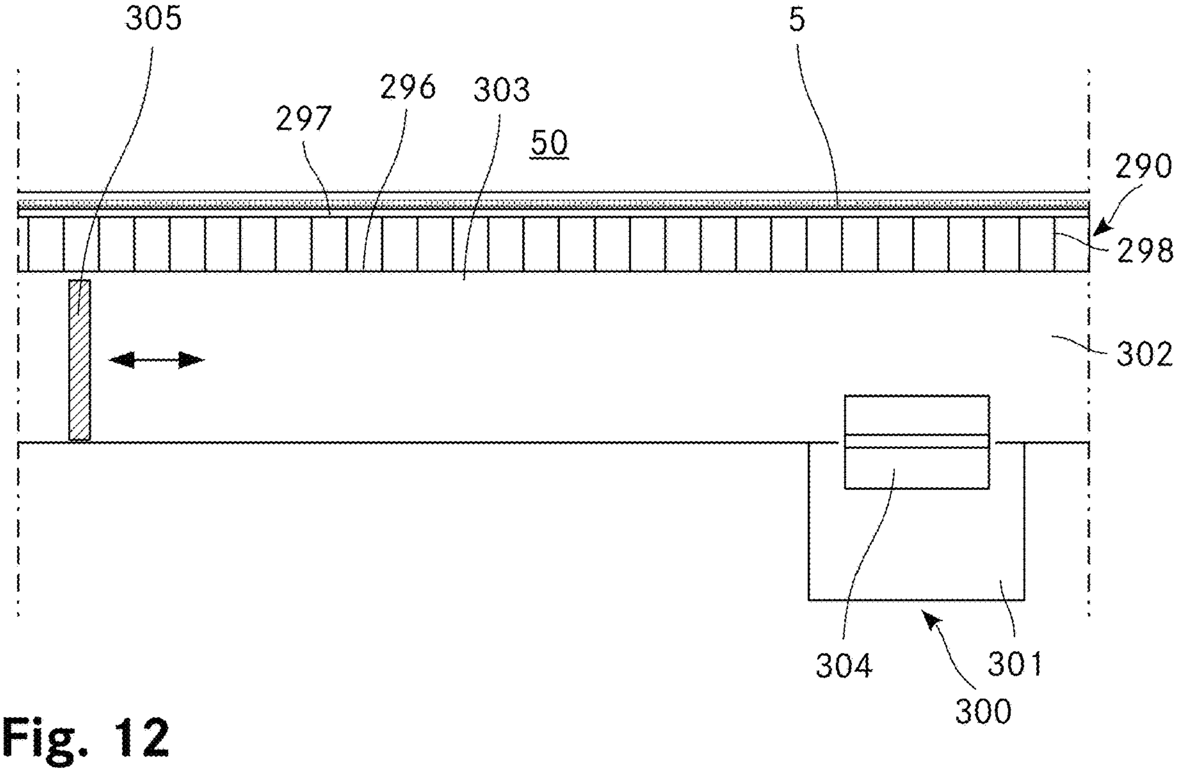
FIG. 12 a schematic illustration of the functioning of a width adjustment mechanism of the vacuum distribution unit.

The FIG. 12 is a schematic illustration of the functioning of a width adjustment mechanism of the vacuum distribution unit. The illustration shows a cross-section through the vacuum distribution unit 300, the support conveyor 290, the sheet 5 supported on the support conveyor 290 and the printing station 50, in a plane perpendicular to the transport direction.

In the vacuum channel 302 a slider 305 is arranged, movable along an axis perpendicular to the transport direction. The slider 305 is designed such that a sealed connection with the contact surface of a support conveyor interacting with the vacuum distribution unit as well as with the floor and the side walls of the vacuum channel 302 is established.

The valve 304 linking the vacuum channel 302 to the suction line 301 is arranged in a middle section of the vacuum distribution unit 300. By sliding the slider 305, the width of the region of the connection opening 303 of the vacuum channel 302 that is effectively in communication with the suction line 301 may be adjusted.

The support conveyor 290 comprises a number of separation walls 298 running in the transport direction, designed in such a way that the plurality of orifices of the vacuum orifice array 297 are connected to connection openings 296 lying essentially below on the lower surface of the support conveyor 290.

Accordingly, by moving the slider 305 the width of the active area of the vacuum orifice array 297 of the support conveyor 290 may be chosen. In a region outside the slider 305, the orifices of the array are not in communication with the suction line and therefore, no air will be sucked through these orifices. In cases where the sheet width is smaller than the width of the support conveyor the required power of the vacuum system is reduced and air movement around the sheet which might impair the print quality is avoided.

It is not required that the separation walls 298 are arranged along the entire width of the support conveyor. In particular, they are not required in a central region that will always be covered with the sheet when the vacuum system is operated.

Figure 13:
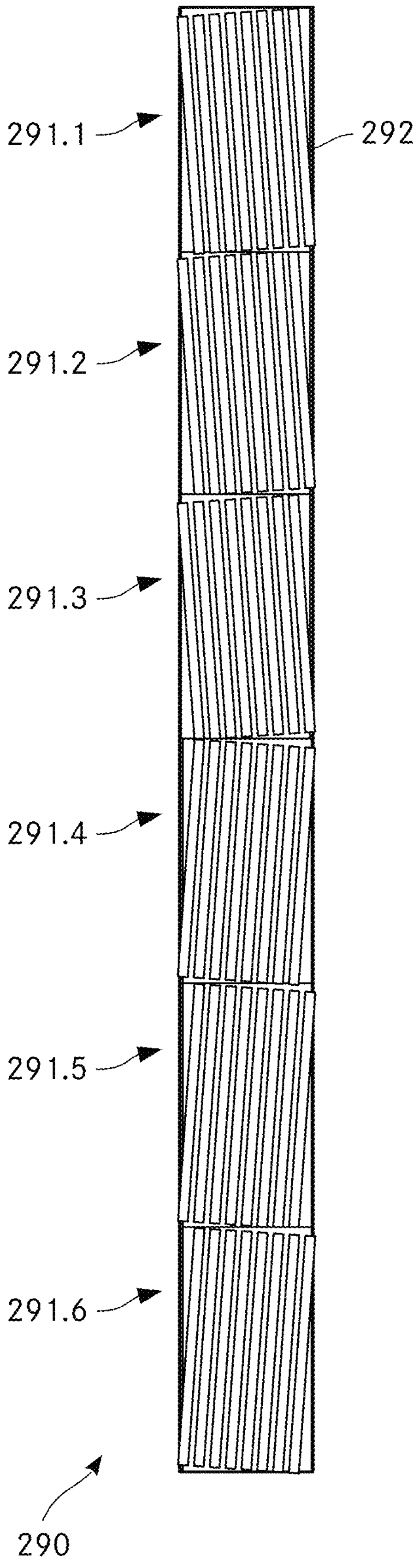
FIG. 13 a top view of a support conveyor featuring a roller arrangement.

The FIG. 13 is a top view of a support conveyor featuring a roller arrangement. The top surface of the support conveyor 290 constitutes the interaction surface for contacting the sheet to be supported. The top surface includes six groups 291.1 . . . 6 of eight rollers 292 each, wherein each group 291.1 . . . 6 covers the entire length of the support conveyor 290 (along the transport direction) and a sixth of the width of the support conveyor 290. The eight rollers 292 of a group 291.1 . . . 6 are freely rotatable and mounted in parallel to each other. The rotation axes of the rollers 292 of the three first groups 291.1, 291.2, 291.3, starting from a first side of the support conveyor 290, are oriented in parallel to the top surface including an angle of 4° with respect to the main extension of the support conveyor 290 (extending perpendicular to the transport direction). The rotation axes of the rollers 292 of the three further groups 291.4, 291.5, 291.6 are oriented in parallel to the top surface including an angle of −4° with respect to the main extension of the support conveyor 290. The orifices of vacuum orifice array are arranged below the rollers 292 and air is sucked in between the neighbouring rollers 292.

The invention is not restricted to the described embodiment or to inkjet printing machines. In particular, dimensions of the machine, the number and type of stations or the geometrical design of machine elements may be different from the shown examples.

As mentioned above, in another embodiment, the support conveyor includes Bernoulli cups in addition to the vacuum system. In this embodiment of the support conveyor, the Bernoulli cups are arranged in a central line along the width of the support conveyor. They are surrounded by the orifices of the vacuum system, which essentially extends over the entire upper surface of the support bar.

Interaction with the vacuum distribution unit is not limited to the support conveyors. In principle, the gripper conveyors may include vacuum systems themselves working similarly as the one of the support conveyor.

In summary, it is to be noted that the invention provides an inkjet printing machine that allows for flexible processing of different sized sheets as well as for increased dynamics and throughput.

The invention claimed is:

1. A machine for processing individual sheets, the machine comprising:

at least one processing station; and a transport system for transporting the individual sheets through the at least one processing station, along a transport direction;

the transport system comprising:

at least one gripper conveyor movable along the transport direction, for gripping an individual sheet of the individual sheets defining a sheet position in the transport direction, and at least one support conveyor movable along the transport direction for supporting a region of the individual sheet, the at least one support conveyor comprising a vacuum system for supporting the individual sheet on an interacting surface of the at least one support conveyor, the vacuum system comprising a plurality of orifices in the interacting surface of the at least one support conveyor, wherein the interacting surface of the at least one support conveyor comprises a plurality of rollers having a rotation axis substantially perpendicular to the transport direction.

2. The machine as recited in claim 1, wherein the machine is an inkjet printing machine and the at least one processing station is an inkjet printing station.

3. The machine as recited in claim 2, wherein the inkjet printing station comprises a plurality of inkjet print bars, the plurality of inkjet print bars covering a printing region extending in a direction across the transport direction.

4. The machine as recited in claim 1, wherein the at least one support conveyor comprises a conveyor connection opening, the conveyor connection opening being fluidly connected to at least one of the plurality of orifices in the interacting surface, and wherein the machine further comprises:

a fixed vacuum distribution unit comprising a distribution unit connection opening wherein the distribution unit connection opening is arranged such that a sealed connection with the conveyor connection opening is established, when the at least one support conveyor moves through a processing region of the machine.

5. The machine as recited in claim 4, wherein the vacuum distribution unit comprises a plurality of distribution unit connection openings arranged along the transport direction, and selectively switchable for at least two subsets of the plurality of the distribution unit connection openings.

6. The machine as recited in claim 5, wherein the distribution unit connection openings extend along a substantial part of the processing region.

7. The machine as recited in claim 5, wherein the vacuum distribution unit further comprises a plurality of chambers arranged along the transport direction, each of the plurality of chambers featuring at least one of the distribution unit connection openings and a valve for selectively closing and opening the at least one of the distribution unit connection openings.

8. The machine as recited in claim 5, wherein the distribution unit connection openings are arranged in a planar surface extending across the processing region, and the conveyor connection openings are arranged in a planar surface of the support conveyor on an opposite side of the interacting surface.

9. The machine as recited in claim 5, further comprising:

a controller for controlling a movement of the at least one support conveyor and the selective switching, wherein the controller is configured to control the selective switching in synchronism with the movement of the at least one support conveyor.

10. The machine as recited in claim 1, wherein the support conveyor comprises a mechanism for adapting the vacuum system to a sheet width of the processed individual sheet.

11. The machine as recited in claim 1, wherein the transport system comprises a circulating track, wherein the at least one gripper conveyor and the at least one support conveyor are running along the circulating track and wherein a section of the circulating track extends in the transport direction.

12. The machine as recited in claim 11, the transport system further comprising electromagnets being controllable in such a way that a movement of the at least one gripper conveyor and a movement of the at least one support conveyor along the circulating track are individually controllable.

13. The machine as recited in claim 1, where the at least one gripper conveyor comprises:

at least one first gripper conveyor comprising a gripper mechanism for gripping a leading edge of one of the individual sheets, and at least one second gripper conveyor comprising a gripper mechanism for gripping a trailing edge of the one of the individual sheets.

14. A machine for processing individual sheets, the machine comprising:

at least one processing station;

a transport system for transporting the individual sheets through the at least one processing station, along a transport direction, the transport system comprising:

at least one gripper conveyor movable along the transport direction, for gripping an individual sheet of the individual sheets defining a sheet position in the transport direction, and at least one support conveyor movable along the transport direction for supporting a region of the individual sheet, the at least one support conveyor comprising a vacuum system for supporting the individual sheet on an interacting surface of the at least one support conveyor, the vacuum system comprising a plurality of orifices in the interacting surface of the at least one support conveyor, wherein the supported individual sheet and the at least one support conveyor are movable along the transport direction with respect to each other; and a control system for controlling a movement of the at least one gripper conveyor and the at least one support conveyor such that the supported region coincides with a processing region of the at least one processing station, wherein the control system is designed to control a speed of movement along the transport direction of the at least one support conveyor to be smaller than a speed of movement along the transport direction of the at least one gripper conveyor, during a processing operation.

15. A process for processing printing individual sheets, the process comprising:

gripping a sheet of the individual sheets by a gripper conveyor running in a transport direction;

transporting, by the gripper conveyor, the gripped sheet along the transport direction, through a processing station;

during the transport through the processing station, supporting a region of the gripped sheet by a support conveyor running in the transport direction; and during the transport of the support conveyor through a processing region of the processing station, selectively switching a number of connections of a vacuum system of the support conveyor, the connections being arranged along the transport direction, wherein a distance between the gripper conveyor and the support conveyor is changed during the transport through the processing station in order to ensure that the supported region coincides with a processing region of the processing station.

16. The process as recited in claim 15, wherein the selective switching is in synchronism with a movement of the support conveyor.

17. The process as recited in claim 15, wherein during transport through the processing station, a transport speed of the support conveyor is smaller than a transport speed of the gripper conveyor.

18. A process for processing printing individual sheets, the process comprising:

gripping a sheet of the individual sheets by a gripper conveyor running in a transport direction;

transporting, by the gripper conveyor, the gripped sheet along the transport direction, through a processing station;

during the transport through the processing station, supporting a region of the gripped sheet by a support conveyor running in the transport direction; and during the transport of the support conveyor through a processing region of the processing station, selectively switching a number of connections of a vacuum system of the support conveyor, the connections being arranged along the transport direction, wherein the gripper conveyor comprises a first gripper conveyor and a second gripper conveyor, and a leading edge of the gripped sheet is gripped by the first gripper conveyor and a trailing edge of the gripped sheet is gripped by the second gripper conveyor, the support conveyor being arranged between the first gripper conveyor and the second gripper conveyor in the transport direction, wherein after the gripping, a distance between the first gripper conveyor and the second gripper conveyor is controlled in such a way that a tensioning force is applied to the individual sheet for straightening the individual sheet.

* * * * *